United States Patent
Pavlovic et al.

(10) Patent No.: US 11,411,336 B2
(45) Date of Patent: *Aug. 9, 2022

(54) SPRING-ACTUATED ELECTRICAL CONNECTOR FOR HIGH-POWER APPLICATIONS

(71) Applicant: Royal Precision Products, LLC, Carol Stream, IL (US)

(72) Inventors: Slobodan Pavlovic, Carol Stream, IL (US); Mohamed Zeidan, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,128

(22) Filed: Aug. 25, 2020

(65) Prior Publication Data

US 2020/0395700 A1  Dec. 17, 2020
US 2022/0190502 A9  Jun. 16, 2022

Related U.S. Application Data

(63) Continuation of application No. PCT/US2018/019787, filed on Feb. 26, 2018.

(51) Int. Cl.
*H01R 13/18* (2006.01)
*H01R 13/17* (2006.01)
(Continued)

(52) U.S. Cl.
CPC ............ *H01R 13/18* (2013.01); *H01R 13/17* (2013.01); *H01R 13/11* (2013.01); *H01R 13/193* (2013.01)

(58) Field of Classification Search
CPC .... H01R 13/18; H01R 13/187; H01R 13/193; H01R 13/10; H01R 13/04; H01R 13/03;
(Continued)

(56) References Cited

U.S. PATENT DOCUMENTS 4,201,438 A   5/1980 Shea
4,416,504 A  11/1983 Sochor
(Continued)

FOREIGN PATENT DOCUMENTS

CN   103141000   6/2013
CN   203193080   9/2013
(Continued)

OTHER PUBLICATIONS

International Search Report from PCT/US2018/019787 dated Nov. 26, 2018 (3 pages).
(Continued)

*Primary Examiner* — Harshad C Patel
(74) *Attorney, Agent, or Firm* — Barnes & Thornburg LLP

(57) ABSTRACT

A spring-actuated electrical connector assembly for electrically and mechanically connecting a device to a power source in high-power, high-voltage applications is disclosed. The connector assembly includes a first connector with an internal receiver, a plurality of side walls, and at least one contact beam. The contact beam integrally extends to an outer surface of the side wall and includes a free end that extends inward of the outer surface of the side wall. An internal spring member is dimensioned to reside within the receiver of the first connector. This assembly also includes a second electrically conductive connector with a receptacle dimensioned to receive both the first connector and the spring member to define a connected position during operation of the device. In the connected position, at least one spring arm of the spring member exerts an outwardly directed force on the contact beam of the first connector to outwardly displace the contact beam into engagement with the second connector.

20 Claims, 18 Drawing Sheets

(51) Int. Cl.
*H01R 13/11* (2006.01)
*H01R 13/193* (2006.01)

(58) Field of Classification Search
CPC ........ H01R 13/02; H01R 13/17; H01R 13/15;
H01R 13/14; H01R 13/11
USPC ........................................................ 439/839
See application file for complete search history.

(56) References Cited

U.S. PATENT DOCUMENTS

| | | | |
|---|---|---|---|
| 4,534,610 A | 8/1985 | Takihara | |
| 4,540,235 A | 9/1985 | Lolic | |
| 4,583,812 A | 4/1986 | Gross et al. | |
| 4,593,464 A * | 6/1986 | Williams | H01R 4/10 228/136 |
| 4,632,483 A | 12/1986 | Verin | |
| 4,632,843 A | 12/1986 | Pich et al. | |
| 4,713,018 A | 12/1987 | Sutton | |
| 4,895,531 A | 1/1990 | Vignoli | |
| 4,902,244 A | 2/1990 | Endo | |
| 4,932,877 A | 6/1990 | Zinn | |
| 4,938,720 A | 7/1990 | Romak | |
| 4,975,066 A | 12/1990 | Sucheski et al. | |
| 4,983,127 A | 1/1991 | Kawai et al. | |
| 5,007,865 A | 4/1991 | Jakobeit | |
| 5,035,661 A | 7/1991 | Steinhardt et al. | |
| 5,094,636 A | 3/1992 | Zinn et al. | |
| 5,120,255 A | 6/1992 | Kouda | |
| 5,162,004 A | 11/1992 | Kuzuno et al. | |
| 5,169,336 A | 12/1992 | Taguchi | |
| 5,188,545 A | 2/1993 | Hass et al. | |
| 5,240,439 A | 8/1993 | Egenolf | |
| 5,288,252 A | 2/1994 | Steinhardt et al. | |
| 5,295,873 A | 3/1994 | Walbrecht | |
| 5,334,058 A | 8/1994 | Hotea | |
| 5,338,229 A | 8/1994 | Egenolf | |
| 5,362,262 A | 11/1994 | Hotea | |
| 5,391,097 A | 2/1995 | Kerul | |
| 5,415,571 A | 5/1995 | Lutsch | |
| 5,419,723 A | 5/1995 | Villiers et al. | |
| 5,437,566 A | 8/1995 | Zinn et al. | |
| 5,486,123 A * | 1/1996 | Miyazaki | H01R 13/15 439/825 |
| 5,536,184 A | 7/1996 | Wright et al. | |
| 5,551,897 A | 9/1996 | Alwine | |
| 5,562,506 A | 10/1996 | Wright | |
| 5,573,434 A | 11/1996 | Ittah et al. | |
| 5,607,328 A | 3/1997 | Joly | |
| 5,624,283 A | 4/1997 | Hotea | |
| 5,664,972 A | 9/1997 | Zinn et al. | |
| 5,716,245 A | 2/1998 | Kameyama et al. | |
| 5,810,627 A | 9/1998 | Gierut et al. | |
| 5,827,094 A | 10/1998 | Aizawa et al. | |
| 5,863,225 A | 1/1999 | Liebich et al. | |
| 5,868,590 A | 2/1999 | Dobbelaere | |
| 5,938,485 A | 8/1999 | Hotea et al. | |
| 5,941,740 A | 8/1999 | Neuer et al. | |
| 5,951,338 A | 9/1999 | Seko et al. | |
| 5,954,548 A | 9/1999 | Stabroth | |
| 5,975,964 A | 11/1999 | Seko et al. | |
| 5,980,336 A | 11/1999 | Hall et al. | |
| 6,042,433 A | 3/2000 | Chen | |
| 6,062,918 A | 5/2000 | Myer | |
| 6,102,752 A | 8/2000 | Bommel | |
| 6,126,495 A | 10/2000 | Lolic | |
| 6,186,840 B1 | 2/2001 | Geltsch | |
| 6,257,931 B1 | 7/2001 | Sakurai | |
| 6,261,116 B1 | 7/2001 | Ceru | |
| 6,273,766 B1 | 8/2001 | Zennamo, Jr. | |
| 6,361,377 B1 | 3/2002 | Saka | |
| 6,371,813 B2 | 4/2002 | Ramey | |
| 6,394,858 B1 | 5/2002 | Geltsch et al. | |
| 6,402,571 B1 | 6/2002 | Muller | |
| 6,475,040 B1 | 11/2002 | Myer et al. | |
| 6,514,098 B2 | 2/2003 | Marpoe, Jr. | |
| 6,561,841 B2 | 5/2003 | Norwood | |
| 6,565,396 B2 | 5/2003 | Saka et al. | |
| 6,679,736 B2 | 1/2004 | Saka | |
| 6,695,644 B2 | 2/2004 | Zhao et al. | |
| 6,722,926 B2 | 4/2004 | Chevassus-More | |
| 6,761,577 B1 | 7/2004 | Koehler | |
| 6,814,625 B2 | 11/2004 | Richmond | |
| 6,824,170 B2 | 11/2004 | Lee | |
| 6,872,103 B1 | 3/2005 | Flieger et al. | |
| 6,921,283 B2 | 7/2005 | Zahlit | |
| 6,994,600 B2 | 2/2006 | Coulon | |
| 7,014,515 B2 | 3/2006 | Lutsch et al. | |
| 7,150,660 B2 | 12/2006 | Allgood et al. | |
| 7,175,488 B2 | 2/2007 | Pavlovic et al. | |
| 7,192,318 B2 | 3/2007 | Hotea | |
| 7,278,891 B2 | 10/2007 | Cvasa et al. | |
| 7,300,319 B2 | 11/2007 | Lutsch et al. | |
| 7,314,377 B2 | 1/2008 | Northey | |
| 7,329,132 B1 | 2/2008 | Kamath | |
| 7,338,305 B2 | 3/2008 | Norwood | |
| 7,491,100 B2 | 2/2009 | Johannes et al. | |
| 7,494,352 B2 | 2/2009 | Furio et al. | |
| 7,497,723 B2 | 3/2009 | Brassell | |
| 7,503,776 B1 | 3/2009 | Pavlovic et al. | |
| 7,520,773 B2 | 4/2009 | Siebens | |
| 7,563,133 B2 | 7/2009 | Stein | |
| 7,568,921 B2 | 8/2009 | Pavlovic et al. | |
| 7,595,715 B2 | 9/2009 | Pavlovic et al. | |
| 7,613,003 B2 | 11/2009 | Pavlovic et al. | |
| 7,647,954 B2 | 1/2010 | Garber | |
| 7,651,344 B2 * | 1/2010 | Wu | H01R 13/6585 439/80 |
| 7,682,180 B2 | 3/2010 | Brown | |
| 7,713,096 B2 | 5/2010 | Pavlovic et al. | |
| 7,758,369 B2 | 7/2010 | Miller | |
| 7,766,706 B2 | 8/2010 | Kawamura et al. | |
| 7,780,489 B2 | 8/2010 | Stuklek | |
| 7,837,519 B2 | 11/2010 | Copper et al. | |
| 7,876,193 B2 | 1/2011 | Pavlovic et al. | |
| 7,892,050 B2 * | 2/2011 | Pavlovic | H01R 13/112 439/839 |
| 7,927,127 B1 | 4/2011 | Glick et al. | |
| 7,942,682 B2 | 5/2011 | Copper et al. | |
| 7,942,683 B2 | 5/2011 | Copper et al. | |
| 7,963,782 B2 | 6/2011 | Hughes | |
| 7,976,351 B2 | 7/2011 | Boemmel et al. | |
| 7,988,505 B2 | 8/2011 | Hotea et al. | |
| 8,111,052 B2 | 2/2012 | Glovinsky | |
| 8,128,426 B2 | 3/2012 | Glick et al. | |
| 8,167,337 B2 | 5/2012 | Bruno | |
| 8,202,124 B1 | 6/2012 | Natter et al. | |
| 8,206,175 B2 | 6/2012 | Boyd | |
| 8,235,292 B2 | 8/2012 | Talboys | |
| 8,242,874 B2 | 8/2012 | Pavlovic et al. | |
| 8,277,243 B1 | 10/2012 | Hernandez | |
| 8,282,429 B2 | 10/2012 | Glick et al. | |
| 8,366,497 B2 * | 2/2013 | Glick | H01R 13/187 439/839 |
| 8,388,389 B2 | 3/2013 | Costello et al. | |
| 8,430,689 B2 | 4/2013 | Myer et al. | |
| 8,446,733 B2 | 5/2013 | Hampo et al. | |
| 8,449,338 B2 | 5/2013 | Gong | |
| 8,475,220 B2 * | 7/2013 | Glick | H01R 13/18 439/839 |
| 8,651,892 B2 | 2/2014 | Arant | |
| 8,662,935 B2 | 3/2014 | Jouas et al. | |
| 8,668,506 B2 | 3/2014 | Stack et al. | |
| 8,678,867 B2 * | 3/2014 | Glick | H01R 13/187 439/843 |
| 8,758,043 B2 | 6/2014 | Ohyama | |
| 8,795,007 B2 | 8/2014 | Itou et al. | |
| 8,840,436 B2 | 9/2014 | Mott et al. | |
| 8,858,264 B2 | 10/2014 | Mott et al. | |
| 8,858,274 B2 | 10/2014 | Jakoplic et al. | |
| 8,941,731 B2 | 1/2015 | Barba | |
| 8,944,844 B2 | 2/2015 | Myer | |
| 8,956,190 B2 | 2/2015 | Natter et al. | |
| 8,968,021 B1 | 3/2015 | Kennedy et al. | |

(56) References Cited

U.S. PATENT DOCUMENTS

| | | | |
|---|---|---|---|
| 8,974,244 B2 | 3/2015 | Tetsuya | |
| 8,992,270 B2 | 3/2015 | Glick et al. | |
| 8,998,655 B2 | 4/2015 | Glick et al. | |
| 9,011,186 B2 | 4/2015 | Wirth et al. | |
| 9,048,552 B2 | 6/2015 | Eyles | |
| 9,059,542 B2 | 6/2015 | Oh | |
| 9,077,114 B2 | 7/2015 | Oh | |
| 9,142,902 B2 * | 9/2015 | Glick | H01R 43/16 |
| 9,166,322 B2 | 10/2015 | Glick et al. | |
| 9,190,756 B2 * | 11/2015 | Glick | H01R 13/18 |
| 9,225,116 B2 | 12/2015 | McKibben | |
| 9,236,682 B2 | 1/2016 | Glick et al. | |
| 9,257,804 B1 | 2/2016 | Beck et al. | |
| 9,293,852 B2 * | 3/2016 | Glick | H01R 13/11 |
| 9,300,069 B2 * | 3/2016 | Morello | H01R 13/113 |
| 9,353,894 B2 | 5/2016 | Richards | |
| 9,356,394 B2 | 5/2016 | Kennedy | |
| 9,368,904 B2 | 6/2016 | Natter et al. | |
| 9,379,470 B2 | 6/2016 | Glick et al. | |
| 9,431,740 B2 * | 8/2016 | Glick | H01R 13/11 |
| 9,437,974 B2 * | 9/2016 | Glick | H01R 13/18 |
| 9,444,168 B2 | 9/2016 | Horiuchi et al. | |
| 9,444,205 B2 | 9/2016 | Rangi et al. | |
| 9,455,516 B2 | 9/2016 | Gutenschwager et al. | |
| 9,502,783 B2 | 11/2016 | Bleicher et al. | |
| 9,525,254 B2 | 12/2016 | Chen | |
| 9,537,241 B2 | 1/2017 | Rivera et al. | |
| 9,548,553 B2 | 1/2017 | Glick et al. | |
| 9,583,860 B1 | 2/2017 | Dewitte | |
| 9,608,369 B1 | 3/2017 | Brandt | |
| 9,620,869 B2 | 4/2017 | Listing et al. | |
| 9,680,256 B1 | 6/2017 | Lane | |
| 9,705,229 B2 | 7/2017 | Itou | |
| 9,705,254 B2 | 7/2017 | Lampert et al. | |
| 9,711,885 B2 | 7/2017 | Hamai et al. | |
| 9,748,693 B1 | 8/2017 | Exenberger | |
| 9,841,454 B2 | 12/2017 | Gelonese | |
| 9,847,591 B2 | 12/2017 | Glick et al. | |
| 9,876,317 B2 | 1/2018 | Glick et al. | |
| 9,905,950 B2 | 2/2018 | Marsh et al. | |
| 9,905,953 B1 * | 2/2018 | Pavlovic | H01R 4/48 |
| 10,014,614 B2 | 7/2018 | Davies et al. | |
| 10,014,631 B1 | 7/2018 | Chambly | |
| 10,038,278 B2 | 7/2018 | Lane | |
| 10,044,140 B1 | 8/2018 | Gianrossi | |
| 10,122,117 B2 | 11/2018 | Miller | |
| 10,135,168 B2 * | 11/2018 | Pavlovic | H01R 13/03 |
| 10,184,970 B2 | 1/2019 | Maalouf | |
| 10,218,117 B1 | 2/2019 | Probert | |
| 10,283,889 B2 * | 5/2019 | Glick | H01R 13/05 |
| 10,355,414 B1 | 7/2019 | Alvarado | |
| 10,693,252 B2 * | 6/2020 | Pavlovic | H01R 13/03 |
| 11,069,999 B2 * | 7/2021 | Fisher | H01R 13/18 |
| 2001/0019924 A1 | 9/2001 | Heimueller | |
| 2001/0021602 A1 | 9/2001 | Zanten | |
| 2002/0019156 A1 | 2/2002 | Fukamachi | |
| 2002/0049005 A1 | 4/2002 | Leve | |
| 2002/0081888 A1 | 6/2002 | Regnier et al. | |
| 2004/0150224 A1 | 8/2004 | Lee | |
| 2005/0134037 A1 | 6/2005 | Bruno | |
| 2005/0211934 A1 | 9/2005 | Garber | |
| 2006/0040555 A1 | 2/2006 | Chen et al. | |
| 2006/0172618 A1 | 8/2006 | Yamashita et al. | |
| 2007/0123093 A1 | 5/2007 | Lutsch et al. | |
| 2007/0149050 A1 | 6/2007 | Oka et al. | |
| 2009/0197457 A1 | 8/2009 | Lanni | |
| 2011/0130023 A1 | 6/2011 | Kataoka | |
| 2011/0168778 A1 | 7/2011 | Talboys | |
| 2011/0171843 A1 | 7/2011 | Casses | |
| 2012/0094551 A1 | 4/2012 | Corman et al. | |
| 2012/0129407 A1 | 5/2012 | Glick et al. | |
| 2012/0244756 A1 | 9/2012 | Jouas et al. | |
| 2013/0002102 A1 | 1/2013 | Chen | |
| 2013/0004050 A1 | 1/2013 | Wu | |
| 2013/0040505 A1 | 2/2013 | Hirakawa | |
| 2013/0078874 A1 | 3/2013 | Itou et al. | |
| 2013/0109224 A1 | 5/2013 | Chin et al. | |
| 2013/0210292 A1 | 8/2013 | Schmidt et al. | |
| 2013/0215573 A1 | 8/2013 | Wagner | |
| 2013/0337702 A1 | 12/2013 | Pavlovic et al. | |
| 2014/0087601 A1 | 3/2014 | Glick et al. | |
| 2014/0193995 A1 | 7/2014 | Barthelmes | |
| 2014/0227915 A1 | 8/2014 | Glick | |
| 2015/0038000 A1 | 2/2015 | Glick | |
| 2015/0072207 A1 | 3/2015 | Soleski | |
| 2015/0074996 A1 | 3/2015 | Glick | |
| 2015/0079859 A1 * | 3/2015 | Glick | H01R 13/11 439/891 |
| 2015/0162706 A1 | 6/2015 | Kennedy | |
| 2015/0255912 A1 | 9/2015 | Natter et al. | |
| 2015/0255924 A1 | 9/2015 | Glick | |
| 2015/0280381 A1 | 10/2015 | Rangi et al. | |
| 2016/0028169 A1 | 1/2016 | Glick | |
| 2016/0043505 A1 | 2/2016 | Wu | |
| 2016/0336572 A1 | 11/2016 | Yoshida | |
| 2017/0338600 A1 | 11/2017 | Tanaka | |
| 2018/0090900 A1 | 3/2018 | Horiuchi et al. | |
| 2018/0191095 A1 | 7/2018 | Pavlovic | |
| 2018/0351282 A1 | 12/2018 | Duan | |
| 2019/0052025 A1 | 2/2019 | Buechli | |
| 2019/0089083 A1 | 3/2019 | Pavlovic | |
| 2019/0372262 A1 | 12/2019 | Christiano | |

FOREIGN PATENT DOCUMENTS

| | | |
|---|---|---|
| CN | 104614564 | 5/2015 |
| CN | 105225040 | 1/2016 |
| CN | 206962160 | 2/2018 |
| CN | 107863610 | 3/2018 |
| DE | 19817924 | 10/1999 |
| DE | 102013211208 | 12/2014 |
| EP | 1291979 | 12/2004 |
| JP | 10-040995 | 2/1998 |
| JP | 10-050376 | 2/1998 |
| JP | 10-050377 | 2/1998 |
| JP | 2011-049107 | 3/2011 |
| JP | 2012043739 | 3/2012 |
| JP | 2017010755 | 1/2017 |
| KR | 20160138442 | 12/2016 |
| WO | 2017195092 | 11/2017 |
| WO | 2019229587 | 12/2019 |

OTHER PUBLICATIONS

Written Opinion from PCT/US2018/019787 dated Nov. 26, 2018 (10 pages).
International Search Report and Written Opinion issued in PCT/US2019/036070, dated Sep. 27, 2019, 8 pages.
International Search Report and Written Opinion issued in PCT/US2019/036010, dated Sep. 30, 2019, 13 pages.
International Search Report and written Opinion issued in PCT/US2019/036127, dated Oct. 4, 2019, 11 pages.
International Search Report and written Opinion issued in PCT/US2020/049870, dated Dec. 10, 2020, 20 pages.
International Search Report and written Opinion issued in PCT/US20/013757, dated Dec. 10, 2020, 7 pages.
International Search Report and Written Opinion issued in PCT/US20/50016, dated Nov. 30, 2020, 14 pages.
International Search Report and Written Opinion issued in PCT/US20/50018, dated Nov. 30, 2020, 14 pages.
International Search Report and Written Opinion issued in PCT/US20/14484, dated Mar. 31, 2020, 7 pages.
International Search Report and Written Opinion issued in PCT/US21/33446, dated Aug. 24, 2021, 17 pages.
International Search Report and Written Opinion issued in PCT/US21/43788, dated Dec. 23, 2021, 23 pages.
International Search Report and Written Opinion issued in PCT/US21/47180, dated Jan. 6, 2022, 18 pages.

(56) References Cited

OTHER PUBLICATIONS

International Search Report and Written Opinion issued in PCT/US21/43686, dated Dec. 23, 2021, 28 pages.

* cited by examiner

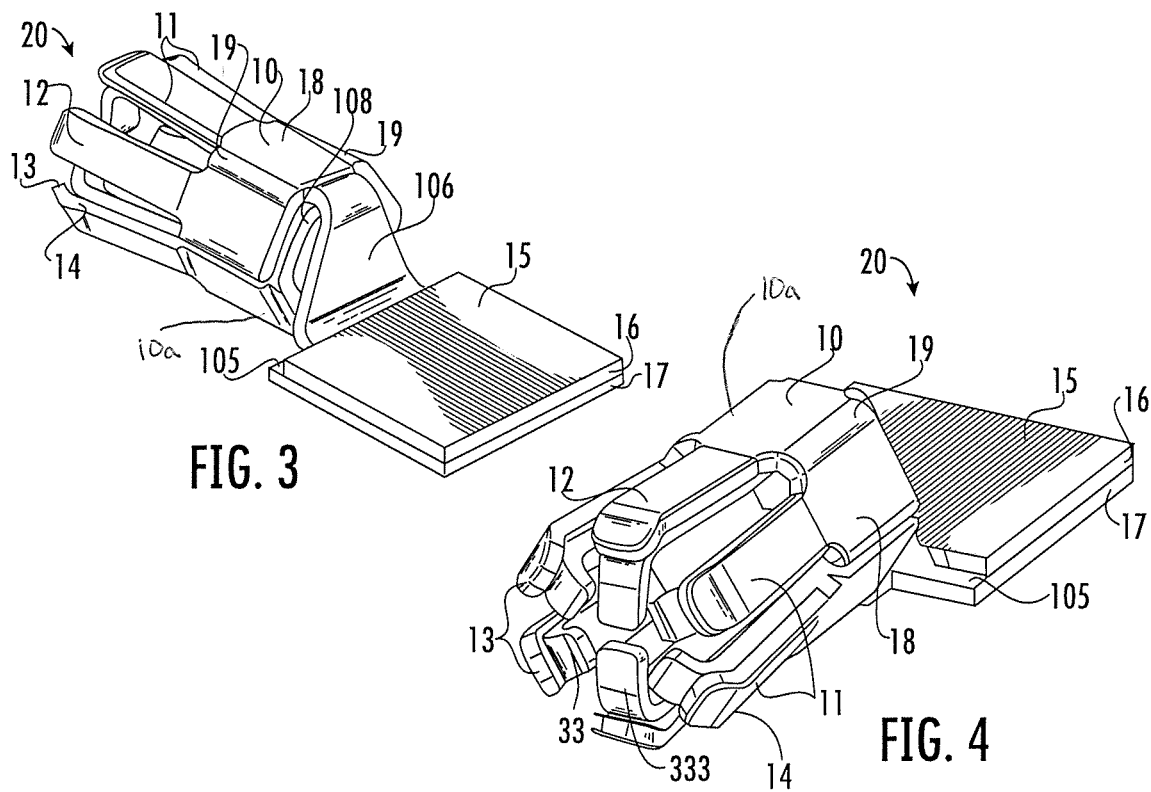
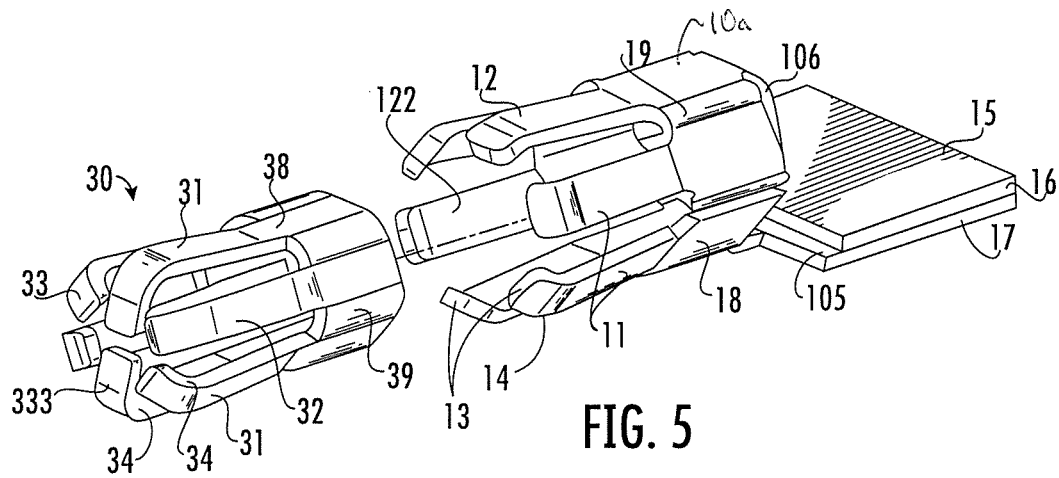
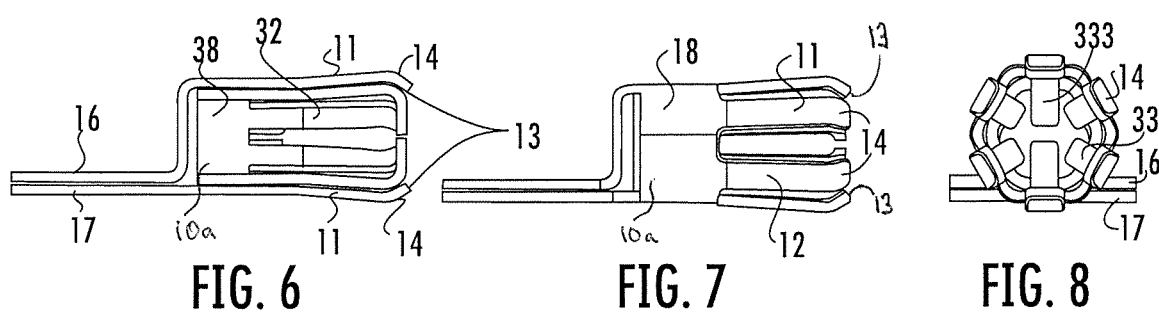

SPRING-ACTUATED ELECTRICAL CONNECTOR FOR HIGH-POWER APPLICATIONS

CROSS REFERENCE TO RELATED APPLICATIONS

The present application claims benefit of and comprises a continuation of U.S. Patent Application No. PCT/US18/19787, filed Feb. 26, 2018, the entirety of which is hereby incorporated by reference herein.

FIELD OF DISCLOSURE

The present disclosure relates to electrical connectors, and, in particular, to high-voltage and/or high-power electrical connectors having a spring actuated or resilient internal securing component. Specifically, the present disclosure relates to electrical connector assemblies for use in motor vehicles, including passenger and commercial vehicles, and/or in other high-power and/or high-voltage applications.

BACKGROUND

Over the past several decades, the amount of electronics in automobiles, and other on-road and off-road vehicles such as pick-up trucks, commercial trucks, semi-trucks, motorcycles, all-terrain vehicles, and sports utility vehicles (collectively "motor vehicles"). Electronics are used to improve performance, control emissions, and provide creature comforts to the occupants and users of the motor vehicles. Motor vehicles are challenging electrical environments due to vibration, heat, and longevity. Heat, vibration, and aging can all lead to connector failure. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

Considerable time, money, and energy have been expended to find connector solutions that meet all of the needs of the motor vehicles market. The current common practice is to use an eyelet and threaded fastener on all high-power connections. The current common practice may be expensive, time-consuming, and prone to failure.

A more appropriate, robust connector solution must be impervious to vibration and heat. In order to create a robust solution, many companies have designed variations of spring-loaded connectors, which have a feature that retains the connector in place. Such spring-actuated connectors typically have some indication to show that they are fully inserted. Sometimes, the spring-actuated feature on the connector is made from plastic. Other times, the spring-actuated feature on the connector is fabricated from spring steel. Unfortunately, although the current state of the art is an improvement over connectors using an eyelet and threaded connector, there are still far too many failures.

Part of the reason that spring-actuated connectors still fail in motor vehicle applications is because the spring element is on the periphery of the connector. By placing the spring tab on the exterior surface of the connector, connector manufacturers tried to make engagement obvious to the person assembling the part. Unfortunately, for both plastic and metal, the increased temperatures of an automotive environment make a peripheral spring prone to failure. The engine compartment of the motor vehicle can often reach temperatures approaching 100° C., with individual components of a motor vehicle engine reaching or exceeding 180° C. At 100° C., most plastics start to plasticize, reducing the retention force of the peripheral spring-actuated feature. At 100° C., the thermal expansion of the spring steel will reduce the retention force of a peripheral spring-actuated connector by a small amount. More important, with respect to spring-actuated features fabricated from spring steel is the effect of residual material memory inherent in the spring steel as the spring steel is thermally cycled. After many temperature cycles, the spring steel will begin to return to its original shape, reducing its retention force and making is susceptible to vibration, all of which significantly reduce the performance of conventional connectors. The motor vehicle market needs a connector that is low-cost, vibration-resistant, temperature-resistant, and robust.

There is clearly a market demand for a mechanically simple, lightweight, inexpensive, vibration-resistant, temperature-resistant, and robust electrical connector. The problem is that all of these design criteria can be conflicting in current prior art. Some of the prior art has attempted to solve the problem using a peripheral spring-actuated retention feature. For example, U.S. Pat. No. 8,998,655, by named inventors Glick, et. al., entitled, "Electrical terminal" ("Glick '655") teaches an electrical terminal in which the contact element is a substantially polyhedron structure, with contact beams. A spring structure, external to the contact beams, exerts force on the contact beams. This arrangement is designed to force positive connection of the contact beams with a substantially round or square terminal pin. U.S. Pat. No. 8,992,270, by named inventors Glick, et. al., entitled, "Electrical terminal" ("Glick '270") teaches a variation on the Glick '655 patent.

U.S. Pat. No. 8,475,220, by named inventors Glick, et. al., entitled, "Electrical terminal" ("Glick '220") teaches an electrical connector formed to have at least one pairs of opposing contact legs extending from a body portion, in which each leg extends to a contact point at which it touches the inner surface of the opposing leg contact. A spring clip can be positioned over one or more of the opposing legs to increase a compressive force. The spring clip may include an alignment feature to limit the clip from rotating and/or pitching. Glick '220 is designed to retain a largely flat or planar terminal element. U.S. Pat. No. 8,366,497, by named inventors Glick, et. al., entitled, "Electrical terminal" ("Glick '497") teaches a variation of Glick '220. All of the Glick patents have the same issue: repeated thermal cycling relaxes the spring steel, reducing the overall retention force. The reduction in the spring-actuated retention force makes the connector more susceptible to wiggling loose due to vibration. Intermittent connections are also a common failure mode. A spring-actuated connector assembly that withstands high-power and high-voltage operating conditions represents an improvement in the art.

The description provided in the background section should not be assumed to be prior art merely because it is mentioned in or associated with the background section. The background section may include information that describes one or more aspects of the subject technology.

SUMMARY

According to an aspect of the present disclosure a second connector and a first connector. The first connector fits inside the second connector, when making an electrical connection. The present disclosure relates to using a spring actuator and/or spring member inside the first connector to force contact beams outward and into electrical contact with the second connector. The present disclosure improves the art because the second connector element is a metallic tubular member where into the first connector is inserted. The first connector has a contact element with a plurality of contact beams. A spring member is nested inside the contact element. The spring member applies an outwardly directed force on the contact beams thereby creating a positive connection and retention force. Unlike the prior art, material memory and thermal expansion will increase, not decrease, the retention force and electrical contact of the electrical connector herein described.

The second connector has a metallic tubular member which has an inner surface, an outer surface, and a defined cross-sectional profile. The metallic tubular member is fabricated from a sheet of highly conductive copper. The highly conductive copper can be C151 or C110. One side of the sheet of highly conductive copper can be pre-plated with silver, tin, or top tin, such that the inner surface of the metallic tubular member is plated.

The first connector has a contact element and a spring member. The contact element has a plurality of contact beams. In the preferred embodiments, at least four contact beams are needed, so that force is exerted on the inner surface of the metallic tubular member is symmetrical. Four beams can be placed at 90° increments, meaning that each beam has one beam directly opposing it within the metallic tubular member; and two beams orthogonal to each member within the metallic tubular member. Each contact beam has a thickness, a bent-termination end, and a planar surface with a length and a width. The contact beam is connected to a contact base at the distal end from the bent-termination. In the illustrated embodiments, the contact element has an even number of beams, which are symmetrical and are evenly spaced. The contact element base cross-section can be round, square, triangular, or polygonal. The illustrated embodiments show contact elements with square and hexagonal cross-sectional profiles. The illustrated embodiments show contact elements with four and six beams.

A spring member is nested inside the first connector. The spring member has spring arms and a base. The spring arms are connected to the base at one end. The spring arms have a bent-termination end, a thickness, and a planar surface with a length and width. In the illustrated embodiments, the spring member has the same number of spring arms as the contact element has contact beams. In the illustrated embodiment, the spring arms can be mapped, one-to-one, with the contact beams. The spring arms are dimensioned so that the bent-termination end of the associated contact beam contacts the planar surface of the spring arm. The spring arms of the illustrated embodiments are even in number, symmetrical, and evenly spaced.

The first connector or contact element fits inside the metallic tubular member or second connector such that the contact beams contact the inner surface of the metallic tubular member. The spring arms force the contact beams into electrical connection with the metallic tubular member. The bent-termination end of the contact arm meets the planar surface of the spring arm, forcing the contact beam to form a large obtuse angle with respect to the contact element base. In the illustrated embodiments of the present disclosure, although not required, the metallic tubular member has a symmetrical cross-section. An important design criteria is that the compliance (inverse of stiffness) exerted on each beam, forcing each beam into contact with the inner surface of the metallic tubular member, be balance by the compliance of all of the other contact beam and spring-arm pairs such that the first connector is kept centered within the metallic tubular member by the force exerted by the beam/spring arm pairs.

The second connector and first connector may both be surrounded by a non-conductive shroud. For the second connector, only the inner surface of the metallic tubular member is exposed. For the first connector, only the contact beams may be exposed. The second connector can be connected to a busbar or other circuit. For example, in an alternator application, the metallic tubular member can be integral with the alternator busbar. The non-conductive plastic shroud would wrap the exterior of the metallic tubular member leaving the inner surface and the busbar exposed. Typically, in such an application, the busbar of the alternator is going to be interior to the alternator housing.

According to an aspect of the present disclosure, a spring-actuated electrical connector assembly for use in a high-power, high-voltage application that exposes the connector assembly to elevated temperatures and thermal cycling includes the connector assembly having a first electrically conductive connector formed from a first material. Further, the first connector has a side wall arrangement defining an internal receiver that extends from an open first end to a second end and comprising a plurality of side walls wherein a side wall includes an aperture and a contact beam extending across an extent of the aperture. Still further, the contact beam integrally extends from a first portion of the side wall at an outward angle to an outer surface of the side wall and includes a free end that extends inward of the outer surface of the side wall without engaging a second portion of the side wall. Also according to this aspect, an internal spring member is formed from a second material and dimensioned to reside within the receiver of the first connector, the spring member having a base and at least one spring arm that extends from the base, and wherein an outer surface of the spring arm and an outer surface of the base are coplanar. This assembly also includes a second electrically conductive connector with a receptacle dimensioned to receive both the first connector and the spring member residing within the receiver of the first connector to define a connected position that withstands the elevated temperatures and thermal cycling resulting from the high-power, high-voltage application, and wherein in the connected position, the spring arm of the spring member exerts an outwardly directed force on the contact beam of the first connector to outwardly displace the contact beam into engagement with an inner surface of the receptacle of the second connector to maintain the first and second connectors in the connected position.

According to another aspect of the present disclosure, a spring-actuated electrical connector assembly for use in a high-power, high-voltage application that exposes the connector assembly to elevated temperatures and thermal cycling includes the connector assembly having a first electrically conductive connector formed from a first material, the first connector having a side wall arrangement defining an internal receiver that extends from an open first end to a second end of the first connector, the side wall arrangement comprising a plurality of side walls, wherein a side wall includes an aperture and a contact beam extending across an extent of the aperture, wherein the contact beam integrally extends from a first portion of the side wall at an outward angle to an outer surface of the side wall, and wherein the contact beam includes a free end that extends inward of the outer surface of the side wall. Further in accordance with this aspect, an internal spring member is formed from a second material, the spring member having a side wall arrangement comprised of a plurality of side walls, wherein a side wall includes an elongated spring arm that extends from an end of the side wall, and wherein an outer surface of the side wall and an outer surface of the spring arm reside in the same plane. Still further, when the spring member is inserted into the receiver of the first connector, the spring arm of the spring member exerts an outwardly directed force on the contact beam of the first connector to outwardly displace the contact beam.

According to yet another aspect of the present disclosure, a spring-actuated electrical connector assembly for use to electrically and mechanically secure an electrical component during high-power, high-voltage application, includes the connector assembly having a first connector formed from a first conductive material, the first connector having a side wall arrangement defining an internal receiver that extends from an open first end to a second end and the side wall arrangement comprising a plurality of side walls, wherein a side wall includes an elongated aperture and a contact beam extending across an extent of the aperture, wherein the contact beam integrally extends from a first portion of the side wall at an outward angle to an outer surface of the side wall, and wherein the contact beam includes a free end. Further in accordance with this aspect, an internal spring member is formed from a second material and dimensioned to reside within the receiver of the first connector, the spring member having a base and at least one spring arm that extends from the base. Also, the connector assembly includes a second connector with a receptacle dimensioned to couple with both the first connector and the spring member while the spring member resides within the receiver of the first connector to define a connected position for operation of the electrical component during the high-power, high-voltage application, and wherein to maintain the first and second connectors in the connected position during prolonged operation of the electrical component, the spring arm of the spring member exerts an outwardly directed force on the contact beam of the first connector to outwardly displace the contact beam into engagement with an inner surface of the receptacle of the second connector.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 is an isometric view of a first connector showing a spring member positioned therein;

FIG. 4 is an isometric view of the first connector, rotated approximately 90° from FIG. 3 and showing the spring member positioned within the first connector;

FIG. 5 is an exploded isometric of the first connector and a spring member;

FIG. 6 is a lateral cut-away view of the first connector and the spring member;

FIG. 7 is a lateral view of the first connector and the spring member;

FIG. 8 is an end view of the first connector and the spring member;

Figure 1:
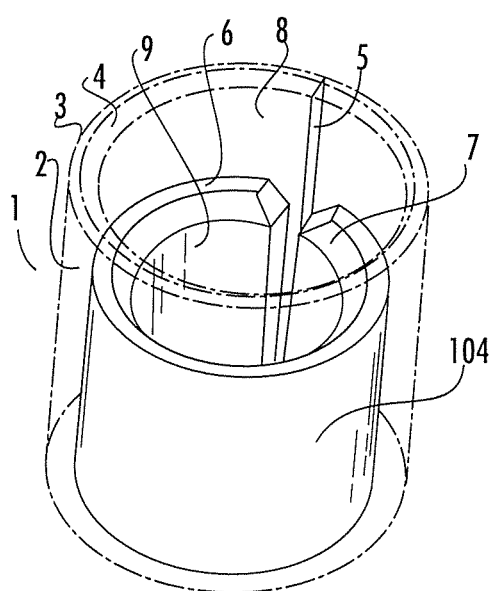
FIG. 1 is an isometric view of a second connector showing a non-conductive plastic shroud and metallic tubular member.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

FIGS. 1-8 show a first embodiment of a high-power spring-actuated electrical connector assembly 866 (see also FIG. 48) comprising a first connector 20, a second connector 1, and a spring member 30 that is positioned within the first connector 20. FIGS. 3-4 show the first connector 20 which includes a contact element 10 having a base 10a with six side walls 18 and six curved segments 19 between respective pairs of adjacent side walls 18. The cross-section of the contact element 10 is substantially hexagonal. The contact element 10 has six contact beams 11 that extend from the side walls 18. Each contact beam 11 has a substantially planar surface 12 terminating in a curvilinear shoulder portion 14 adjacent a free end 13. Ends of each of the contact beams 11 distal from the curvilinear shoulder portion 14 are connected to the side walls 18 and may be integrally formed therewith. The thickness and width of the planar surface 12 dictate the current carrying load of each contact beam 11. In use, the contact beams 11 form a large obtuse angle with the side walls 18 and, thus, extend outward relative to the side walls 18.

The contact element 10 is fabricated from an integral piece. The contact element 10 is made out of conductive metal, such as copper alloys C151 or C110. The first connector 20 is formed, bent, and/or folded into the desired shape. The contact element 10 has two planar connection plates 16, 17. The planar connection plates 16, 17 have a thickness as well as planar surfaces 15, 105. A transition portion 106 couples the hexagonal base 10a of the contact element 10 with the planar connection plates 16, 17.

FIG. 5 further illustrates the first connector 20 by showing the spring member 30 exploded out from an internal receiver of the contact element 10 wherein the internal receiver is defined by the arrangement of the contact beams 11 and the side walls 18. In FIGS. 3 and 4, the spring member 30 is disposed within the internal receiver of the contact element 10. The exploded view further depicts the contact element 10, the contact beams or arms 11, the hexagonal base 10a having side walls 18, 19, and the planar connection plates 16, 17. The planar surfaces 15, 105 and transition portion 106 are also visible. The spring member 30 has a plurality of spring arms 31. The spring arms 31 have a substantially planar surface 32, a thickness 34, and a rounded termination portion 33, 333. The spring member base 10a is substantially hexagonal with six flat side walls 38 and six bent portions 39. The spring member 30 may be fabricated from spring steel, stainless steel, and/or another suitable material. The spring member 30 is preferably fabricated from a material having a higher coefficient of thermal expansion than the material from which the contact element 10 is fabricated. The spring arms 31 of the spring member 30 form a large obtuse angle with the spring member base side walls 38 and, thus, extend outward relative to the side walls 38.

The spring member 30 is dimension to be insertable within the internal receiver of the contact element 10, wherein the spring arms 31 of the spring member 30 contact the inside planar surface 122 of the contact beams 11 of the contact element 10. The inside planar surface 122 of the contact beams 11 is obverse to the outside planar surface 12 of the contact beams 11. The rounded shoulder portion 14 of the contact element 10 allows the first connector 20 to be compressed as it is inserted into the second connector 1. The spring arms 31 provide an outwardly directed biasing force against the inside surface 122 of the contact beams 11. In practice, it may be desirable to use a minimum of four (4) contact beams 11 in example embodiments.

FIGS. 6-7 show a lateral cutaway (FIG. 6) and a lateral view (FIG. 7). The relation of the planar connection plates 16, 17 to the contact beams 11 and rounded shoulder portion 14 is illustrated. The spring member 30, spring arms 31, flat planar surface 32, and flat side wall 38 are shown in the cutaway. The relation of the six side walls 18 of the hexagonal base 10a to the planar surfaces 12 of the contact beams 11 is shown.

FIG. 8 shows an end-view of the spring member 30 disposed within an internal receiver of the contact element 10. The curvilinear shoulder portions 333, 33 of each of the spring arms 31 push the rounded shoulder portions 14 of each of the contact beams 11 outward relative the interior of the contact element 10.

Figure 9:
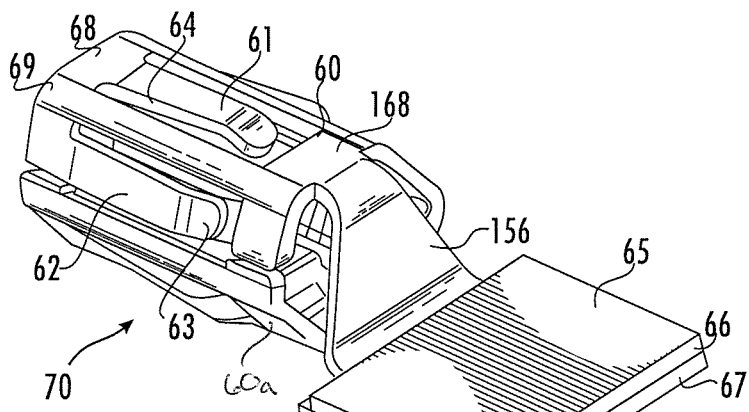
FIG. 9 is an isometric view of an alternative embodiment of the first connector and the spring member.
Figure 10:
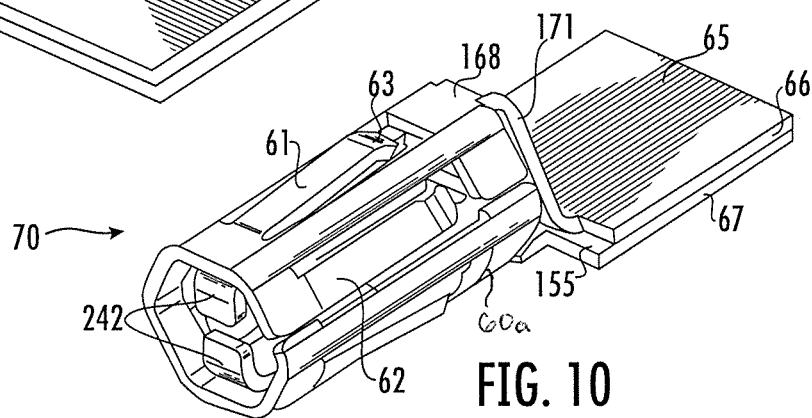
FIG. 10 is an isometric view of an alternative embodiment of the first connector and the spring member, rotated approximately 90° from FIG. 9.

FIGS. 9-10 show an alternative embodiment of the high-power, spring-actuated electrical connector 100. The first connector 70 includes a contact element 60 having a contact element base 60a with six side walls 68 having rounded portions 69 disposed therebetween. The contact element base 60a may be substantially hexagonal. The contact element 60 has six contact beams 61. Each contact beam 61 has a substantially planar surface 62 terminating in a rounded termination portion 63. The thickness 64 and surface area of the planar surfaces 62 of the contact beams 61 dictate the current carrying load of each said contact beam 61. The contact beams 61 form a large obtuse angle with the side walls 68. In this embodiment, the contact beams 61 have been reversed relative to the connection plates 66, 67. Further, the side walls 68 connect to the contact beams 61 on a first end thereof and an additional flat portion 168 of the base 60a is disposed proximal the rounded termination portions 63 of the contact beams. The rounded termination portions 63 extend outward from the contact element side walls 68 and beyond the plane of the additional flat portions 168.

The contact element 60 may be formed from a single integral piece. The contact element 60 is made out of conductive metal, such as copper alloys C151 or C110. The contact element 60 is formed, bent, and folded into the desired shape. The contact element 10 has two planar connection plates 66, 67. The planar connection plates 66, 67 have a thickness and first and second planar surfaces 65, 155. The planar connection plate 66 connects with the flat portions 168 of the contact element 60 by a transition portion 156 having a thickness 171.

Figure 11:
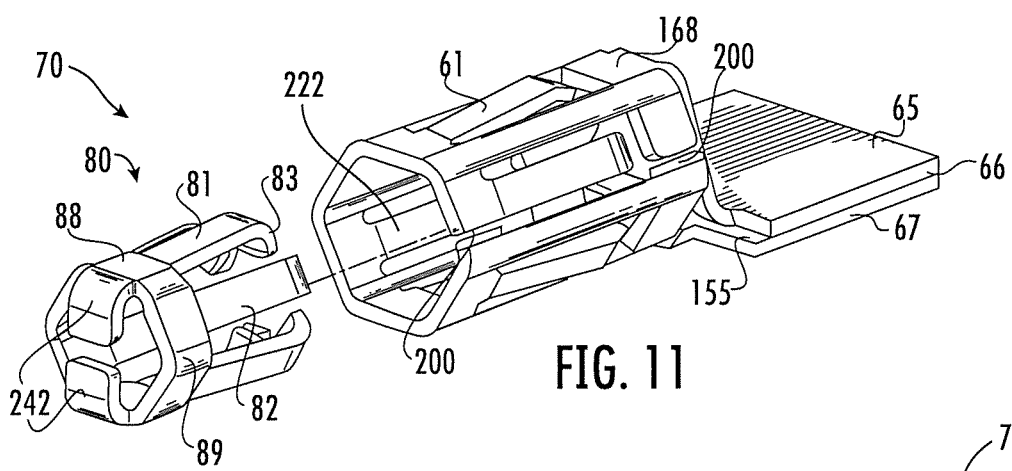
FIG. 11 is an exploded isometric of the alternative embodiment of the first connector and the spring member.

FIG. 11 further illustrates the first connector 70 of the present disclosure by showing the spring member 80 exploded out from the contact element 60. Still visible in the contact element 60 are the contact beams 61, the additional flat portions 168, and the planar connection plates 66, 67. The gap 200 caused by forming the contact element 60 out of a single piece of copper is also visible in this orientation. The spring member 80 has a plurality of spring arms 81. The spring arms 81 have a substantially planar surface 82 and a rounded termination portion 83. The spring member base is substantially hexagonal with six flat sides 88 and five rounded portions 89. The spring member 80 is fabricated from spring steel, stainless steel, and/or another suitable material having high stiffness. The spring arms 81 of the spring member 80 form a large obtuse angle with the spring member side walls 88 of the spring member 80.

The spring member 80 is dimensioned to be insertable within an internal receiver defined by the contact element 60. The spring arms 81 contact inside planar surfaces 222 of the contact beams 61. The rounded termination portion 63 of each of the contact beams 61 allows the first connector 70 to be compressed as it is inserted into the second connector 1. The spring arms 81 will provide a consistent retention force against the inside surface 222 of the contact beams 61 thereby mechanically and electrically engaging the contact beams 61 with the second connector 1.

Figure 12:
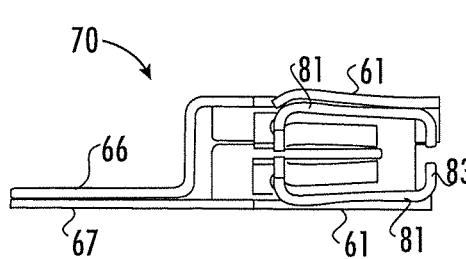
FIG. 12 is a lateral cut-away view of the alternative embodiment of the first connector and the spring member.
Figure 13:
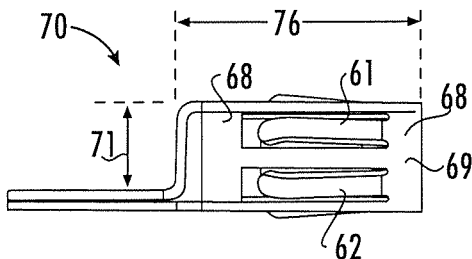
FIG. 13 is a lateral view of the alternative embodiment of the first connector and the spring member.
Figure 14:
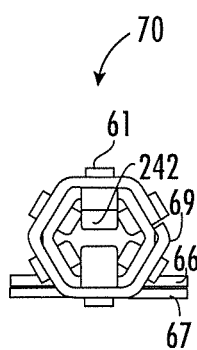
FIG. 14 is an end view of the alternative embodiment of the first connector and the spring member.

FIGS. 12-13 show a lateral cutaway (FIG. 8) and a lateral view (FIG. 9). The relation of the planar connection plates 66, 67 to the contact beams 61 is illustrated. The spring arms 81 and rounded termination portions 83 thereof are shown in the cutaway. The relation of the six sides 68 of the hexagonal base 60a to the planar surfaces 62 of the respective contact beams 61 is shown. The first connector 70 has, generally, a length 76 and a width 71. A ratio of length 76 to width 71 is the aspect ratio of the first connector 70. FIG. 14 shows an end-view of the spring member 80 inside the contact element 60. The bottom rounded termination 242 of the spring member 80 is visible.

Figure 2:
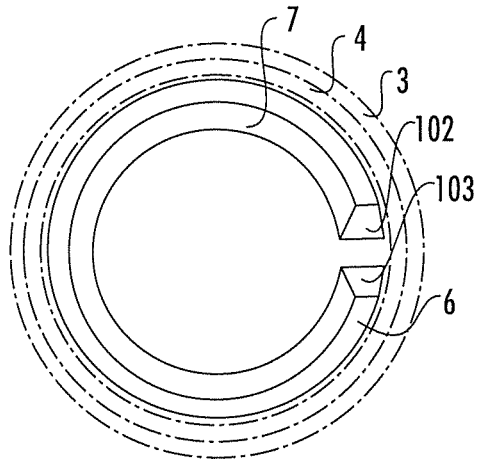
FIG. 2 is a top view of the second connector.

FIGS. 1-2 show the second connector 1 of the present disclosure. The second connector portion 1 of the present disclosure comprises a cylindrical plastic shroud 5 and a cylindrical stamped metallic terminal 6, 7, 8, 9, 102, 103, 104. The plastic shroud 5 is a cylinder with an outer surface 2, an inner surface 8, an upper edge 3, and a taper 4 connecting the inner cylindrical surface 8 and the upper edge 3. The plastic shroud 5 may be made from high-temperature polymers, such as high-temperature polyamide (e.g., nylon 66) and/or another suitable insulating material. The second connector 1 has an outer cylindrical surface 104, an inner cylindrical surface 9, an upper edge 6, a taper 7 connecting the upper edge 6 and the inner cylindrical surface 9, and two fillets 102, 103.

The first connector 20, 70 fits inside the second connector portion 1. At elevated temperatures, the contact element 10, 60, and the spring member 30, 80, will tend to expand outwards due to metal memory and thermal expansion. This may increase the outward directed biasing spring force exerted by the spring arms 31, 81 on the contact beams 11, 61. In turn, this increases the contact force between the contact beams 11, 61 and the inner cylindrical surface 9 of the second connector portion 1. As a result, the increased temperatures present in a motor vehicle engine compartment will increase, rather than decrease, the contact force of the connector assembly 866.

FIGS. 21-24 illustrate the interaction of the first connector 70 and the second connector 1. The inner diameter 90 of the inner cylindrical surface 9 of the second connector 1 contacts the contact element 60. The spring member 80 exerts outward force on the contact element 60 pushing the contact beams 61 of the contact element into the connector. The rounded termination portions/shoulders 63 of the contact beams 61 contact the inner diameter 90 of the second connector 1. The upper edge 6, taper 7, and fillets 102, 103 are oriented nearer the bent-termination portion 63 of the contact beams 61 in this embodiment.

Figure 15:
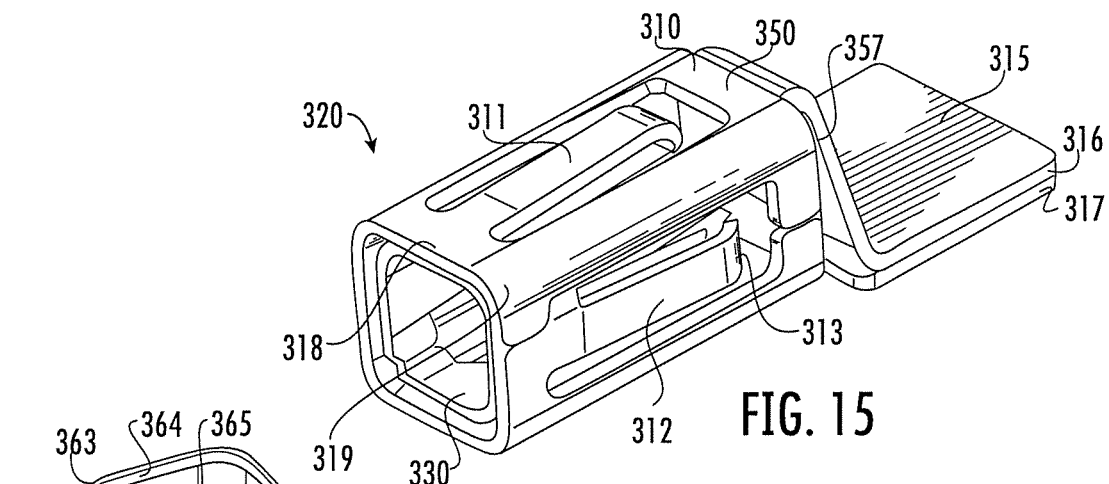
FIG. 15 is an isometric view of the alternative embodiment of the first connector and the spring member.

FIG. 15 shows another alternative embodiment of the first connector 320 of the high-power, spring-actuated electrical connector. The first connector 320 includes a contact element 310 comprising four sides 318 and four rounded portions 319. The cross-section of the contact element 310 is substantially a square or rounded square with rectangular planar surfaces: the four side walls 318, the four bent portions 319, and the substantially square base 350. The contact element 310 has four contact beams 311. Each contact beam 311 has a substantially planar surface 312 terminating in a rounded termination portion 313. The contact beams 311 form a large obtuse angle with the side walls 318 of the contact element 310.

The contact element 310 may be fabricated from a single integral piece. The contact element 310 is fabricated from an electrically conductive metal, such as copper alloys C151 or C110. The contact element 310 may be formed, bent, pressed, and/or folded into the desired shape. The contact element 310 has two planar connection plates 316, 317. The planar connection plates 316, 317 have a thickness and a planar surface 315. The planar connection plates 316, 317 extend from the substantially square base 350. The transition portion 357 connects the substantially square base 350 with the planar connection plates 316, 317. A spring member 330, as shown in FIG. 15, is disposed interior to the contact element 310 within an internal receiver formed by the side walls 318 of the contact element 310 and that extends from an open first end to a closed second end of the first connector 320. Referring still to FIG. 15, the contact element 310 has four side walls 318 with respective apertures disposed therethrough. The contact beams 311 are formed in the side walls 318 at an intermediate portion thereof. The intermediate portion is arranged between the open first end of the contact element base 310 and the second end of the base proximal the transition 357. Each contact beam 311 extends across an extent of the corresponding elongated aperture of each side wall 318.

Figure 16:
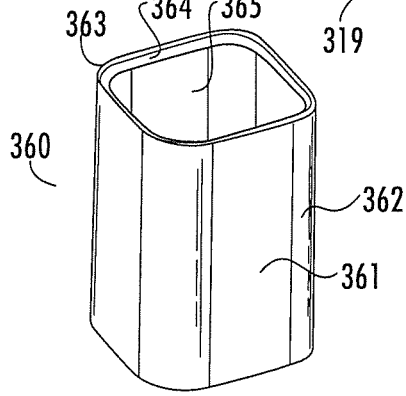
FIG. 16 is an isometric view of the alternative embodiment of the second connector and insulating shroud used with the first connector.
Figure 17:
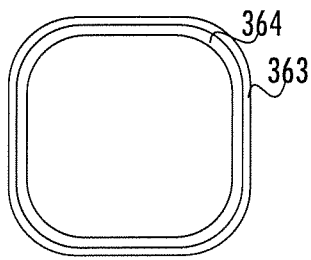
FIG. 17 is a top view of the alternative embodiment of the second connector and insulating shroud of FIG. 16.

FIGS. 16-17 show an alternative embodiment of the second connector 360 that resides within an internal receiver of the first connector 320, shown in FIG. 15, with a substantially square cross-sectional base. In these drawings, the plastic shroud of the second connector 360 is omitted for clarity. The second connector 360 has an outer surface 362, 361, an inner surface 365, an upper edge 363, and a taper 364 that connects the upper edge 363 to the inner surface 365. The first connector 320 fits inside the second connector 360. The second connector 360, perhaps having differing overall dimensions, may be used with embodiments of the first connector 320, 520, 620, 820 shown in FIGS. 15, 25-31, and 45-50.

Figure 18:
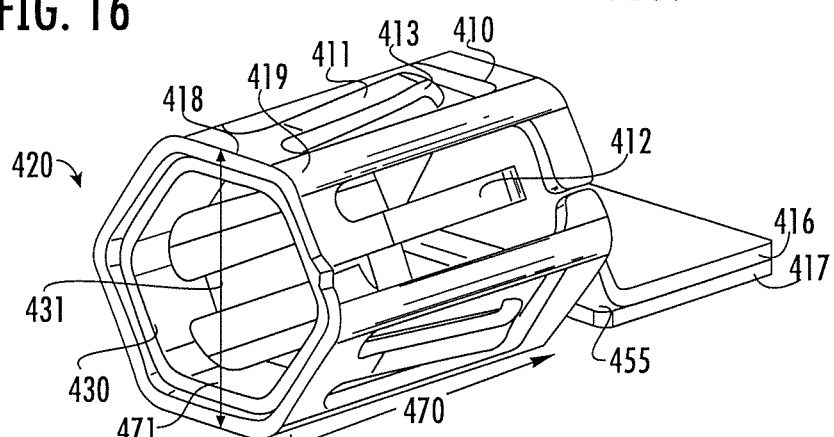
FIG. 18 is an isometric view of the alternative embodiment of the first connector and the spring member.

FIG. 18 is another embodiment of the first connector 420 of the high-power, spring-actuated electrical connector, which is similar to that shown in FIGS. 9-14, except with a different aspect ratio. The first connector 420 includes a contact element 410 having a base, six sides 418, and six rounded portions 419. The cross-section of the contact element 410 base is substantially hexagonal with rectangular planar surfaces 418. The contact element 410 has a six contact beams 411. Each contact beam 411 has a substantially planar surface 412 adjacent a rounded termination portion 413. The contact beams 411 form a large obtuse angle with the side walls 418 of the contact element 410.

The contact element 410 may be manufactured from a single integral piece. The contact element 410 is fabricated from a conductive metal, such as copper alloys C151 or C110. Further, the contact element 410 may be formed, bent, pressed, and/or folded into the desired shape. The contact element 410 has two planar connection plates 416, 417. The planar connection plates 416, 417 have a planar surface 455. A spring member 430 with spring arms 431 is disposed within an internal receiving space of the contact element 410. The first connector 420 has, generally, a length 470 and a width 471. A ratio of length 470 to width 471 is the aspect ratio of the first connector 420.

Figure 19:
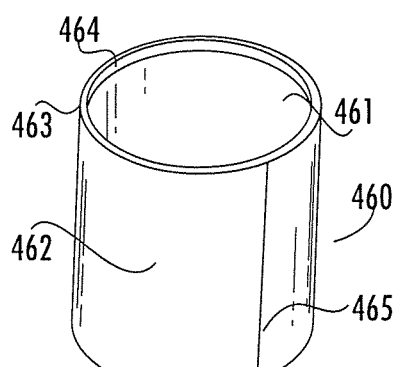
FIG. 19 is an isometric view of an alternative embodiment of the second connector.
Figure 20:
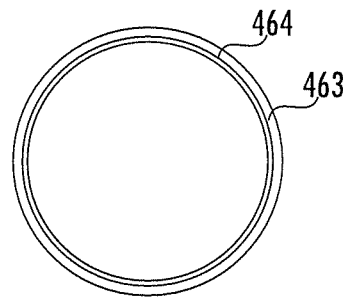
FIG. 20 is a top view of an alternative embodiment of the second connector.
Figure 21:
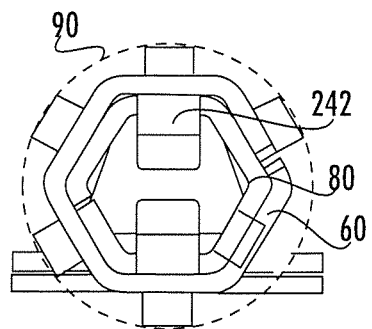
FIG. 21 is an end view of the first connector with an envelope of an interior of the second connector drawn as a dotted line.
Figure 22:
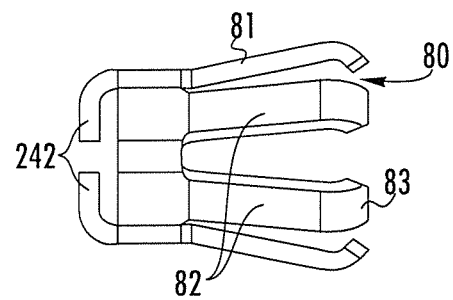
FIG. 22 is an isolated lateral view of the spring member of the first connector.
Figure 23:
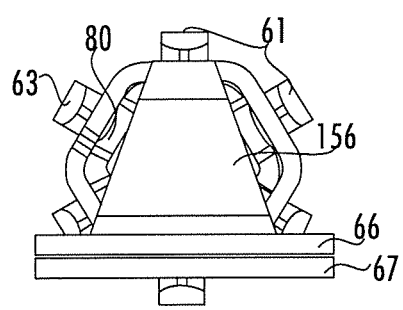
FIG. 23 is a reverse end view of the first connector.
Figure 24:
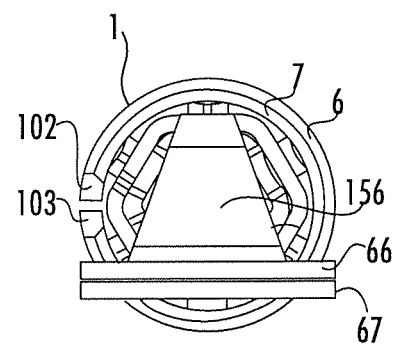
FIG. 24 is a reverse end view of the first connector mated with the second connector.
Figure 25:
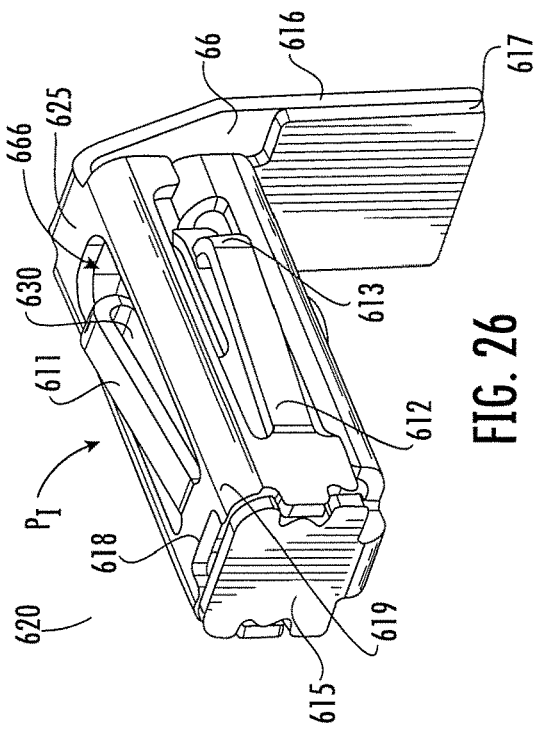
FIG. 25 is an isometric view of an alternative embodiment of the first connector and a spring member positioned within the connector.
Figure 26:
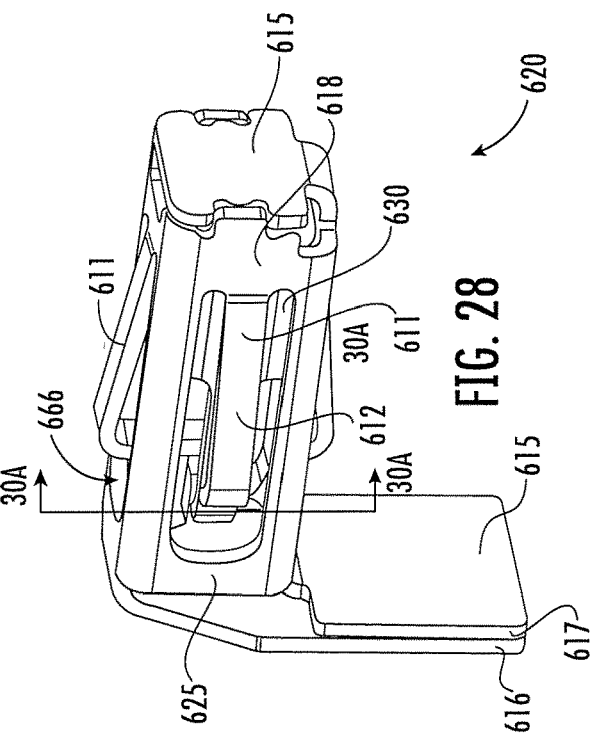
FIG. 26 is an isometric view of an alternative embodiment of the first connector and a spring member positioned within the connector.
Figure 27:
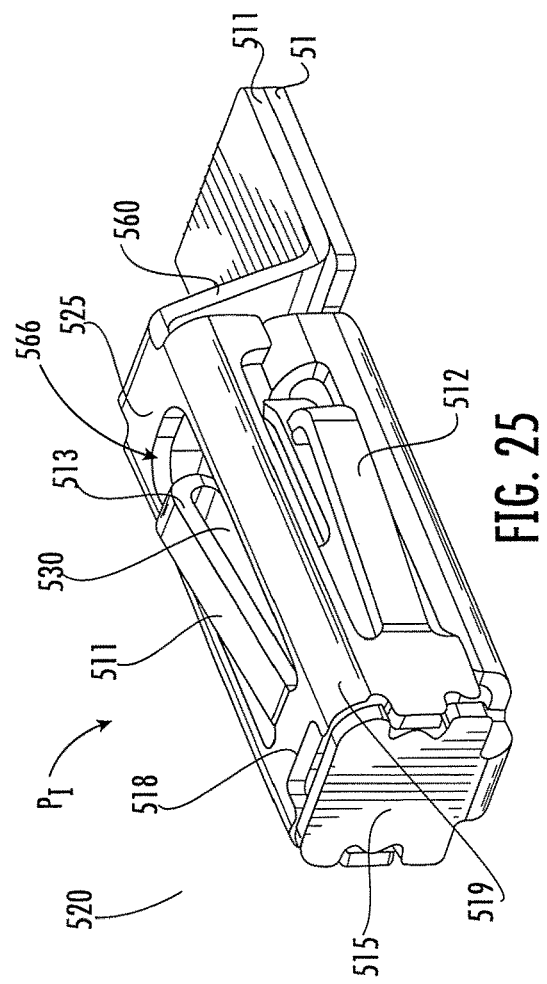
FIG. 27 is a rotated isometric view of the first connector and spring member of FIG. 25.
Figure 28:
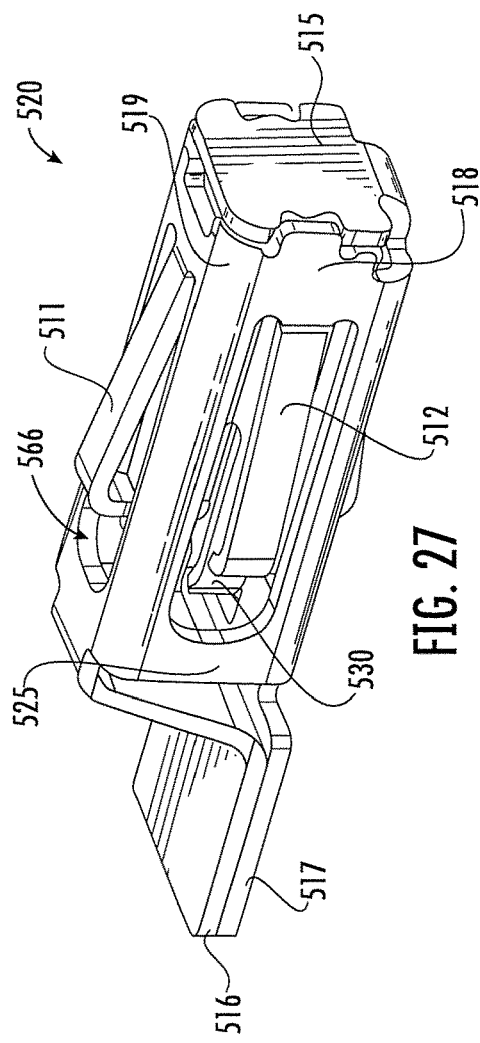
FIG. 28 is a rotated isometric view of the first connector and spring member of FIG. 26.

FIGS. 19-20 show an alternative embodiment of the second connector 460 that would mate with a first connector 420 having a hexagonal cross-sectional base. In these drawings, the plastic shroud of the second connector portion 460 is omitted for clarity. The second connector 460 has an outer surface 462, an inner surface 461, an upper edge 463, and a taper 464 that connects the upper edge 463 to the inner surface 461. The first connector 420 fits within and mechanically and electrically engages the second connector 460 when the first and second connectors 420, 460 are in a connected position.

FIGS. 25-28 show two additional alternative embodiments of the connector assembly with a first connector 520, 620 with a square or rounded square cross-section and the spring member 520. The embodiments have many elements in common: four side walls 518, 525, 618, 625 with respective apertures 566, 666 disposed therethrough; four bent and/or rounded portions 519, 619 disposed between respective adjacent side walls 518; contact beams 511, 611 that have planar surfaces 512, 612; a curvilinear, rounded-termination portion 513, 613 adjacent to a free end 568; a bottom plate 515, 615; and a spring member 530, 630. The contact beams 511, 611 extend across an extent of the respective apertures 566, 666. A majority extent of the contact beams 511, 611 is external to the outer surface of the side walls 518, 525, 618, 625, because the contact beams 511, 611 extend at an outward angle to the side walls 518, 618. These two embodiments also have planar connection plates: 560, 516, 517; and 660, 616, 617. In one embodiment 520, the connection plate 560, 516, 517 is parallel with two of the four sides 518, 525. In the other embodiment 620, the connection plate 660, 616, 617 is orthogonal to all four sides 618, 625.

Figure 29:
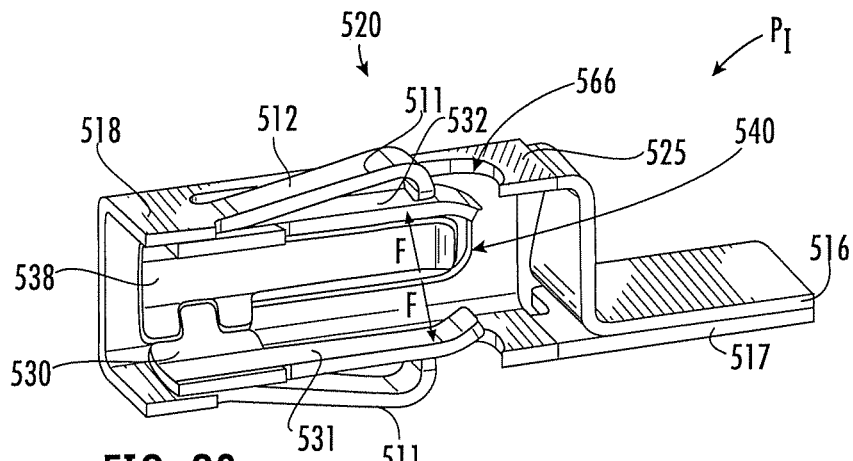
FIG. 29 is a cut-away lateral view of an alternative embodiment of the first connector and the spring member shown in FIG. 25.
Figure 30:
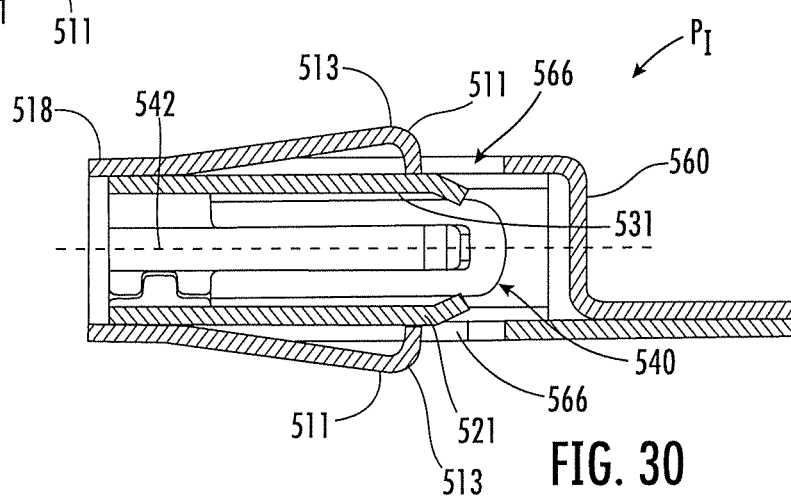
FIG. 30 is a cut-away lateral view of the alternative embodiment of the first connector and the spring member shown in FIG. 29.
Figure 31:
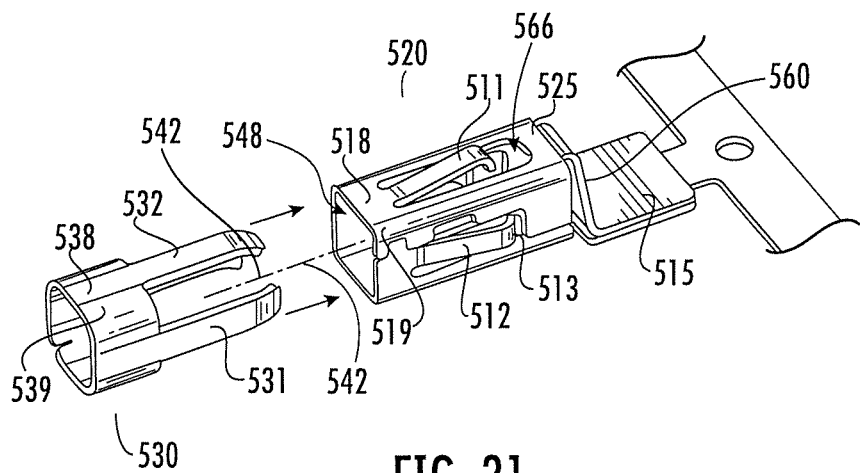
FIG. 31 is a lateral exploded view of the first connector and the spring member of FIG. 25.
Figure 30A:
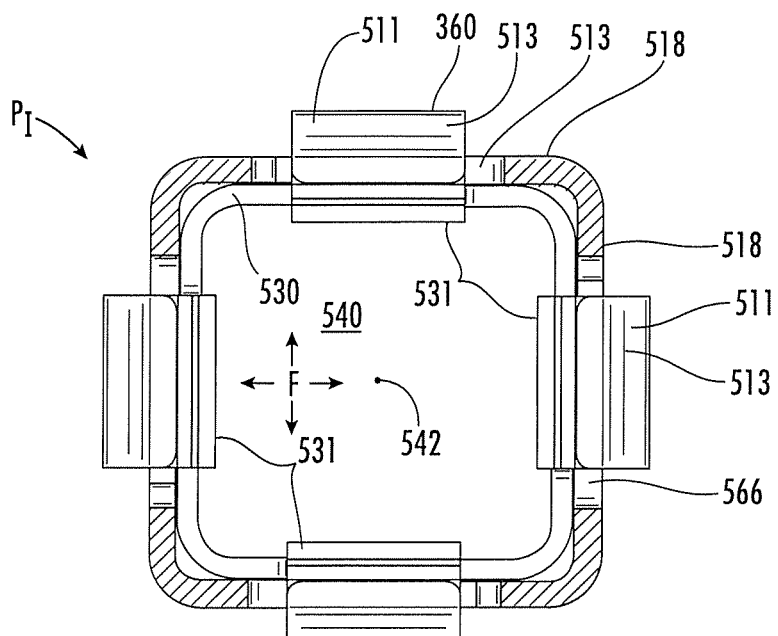
FIG. 30A is a cross-sectional view of the first connector and the spring member taken along line 30A-30A as shown in FIG. 28.
Figure 30B:
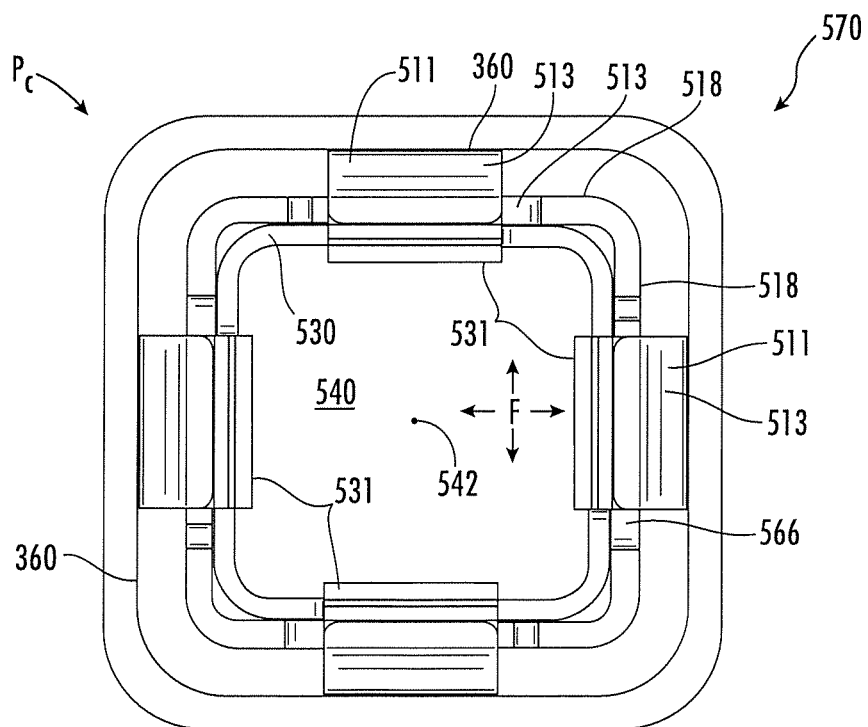
FIG. 30B is a cross-sectional view of a high-power, spring-actuated electrical connector sub-assembly taken along a line similar to line 30A-30A and including the second connector of FIGS. 16 and 17.

FIGS. 29-30 are an isometric cutaway and a lateral cutaway of the first connector 520 with a square or substantially square cross-section, respectively. FIG. 30A illustrates a cross-sectional view, taken along line 30A-30A of FIG. 28, of the first connector 520 shown in FIGS. 25-30 and 31. FIG. 30B illustrates a cross-sectional view of the electrical connector assembly, i.e., the first connector 520 inserted within a receptacle of the correspondingly shaped second connector 360 shown in FIGS. 16 and 17 to define a connected position $P_C$. In the connected position $P_C$, the spring arms 531 exert an outwardly directed force F on the contact beams 511 to displace the contact beams 511 into engagement with an inner surface of the receptacle of the second connector 360 to maintain the connectors 520, 360 in the connected position $P_C$, which ensures that the connector assembly 570 withstands elevated temperatures and thermal cycling resulting from the high-power, high-voltage application. FIG. 31 is an isometric exploded view of the first connector 520 (previously illustrated in FIGS. 25-28) and the spring member 530. In an intermediate position $P_I$, the spring member 530 resides within an internal receiver 540 of the first connector 520 that extends from an open first end to a second end of the first connector 520. The first connector 520 and the internal receiver 540 formed therein have a centerline 542 (see FIGS. 30 and 31) passing substantially through the center(s) thereof. The spring member 530 has spring arms 531 and a base portion 538 configured such that the spring arms 531 are co-planar with the base 538. Both the spring member 530 and the spring arms 531 may be fabricated from spring steel and/or stainless steel.

The spring arms 531 have a flat planar surface 532 which exert outward force on the contact beams 511. As illustrated by the arrows in FIG. 29, an outwardly directed biasing force F exerted by the spring arms 531 is directed away from the centerline 542 of the receiver 540 and first connector 520. Each of the spring arms 531 have a curvilinear shoulder or bent portion 521. The contact beams 511 have a flat planar surface 512 and a curvilinear shoulder or bent portion 513 adjacent to the free end 568. In the $P_I$, of FIGS. 29-30, 30A, and 30B, the free end 568 of the contact beam 511 contacts the flat planar surface 532 of the corresponding spring arm 531. This allows the spring arms 531 to be coplanar with the base portion 538 of the spring member 530 so that they do not become overstressed during the fabrication process. Referring again to FIG. 31, arrows depict a direction of movement when the spring member 530 is inserted into the internal receiver 540 of the first connector 520 through the open first end, distal the connection plate 560, towards the second end, proximal the connection plate 560 to arrive at $P_I$.

Figure 45:
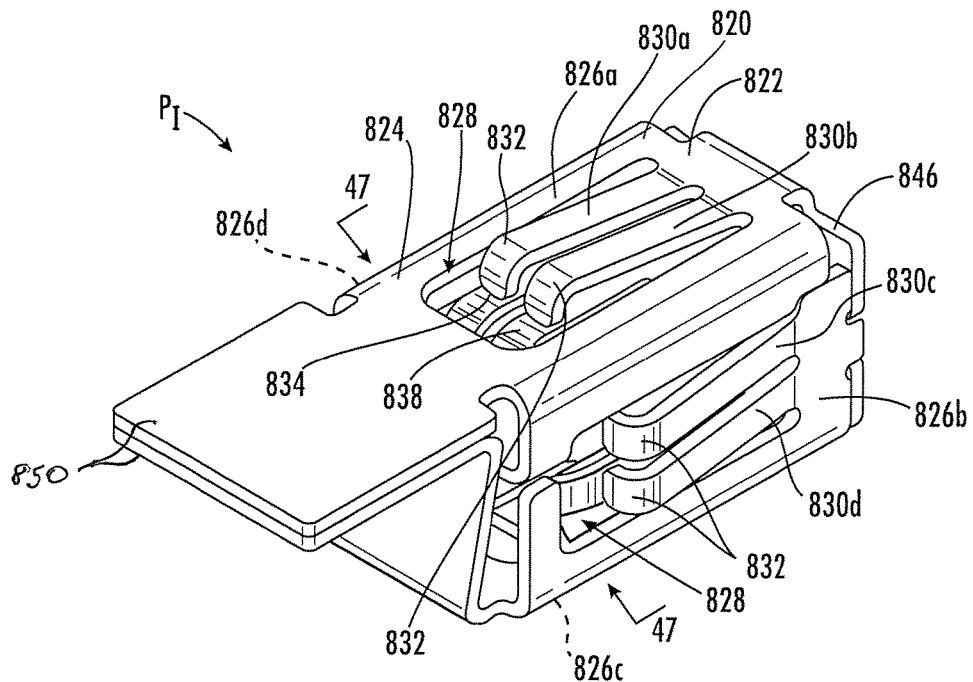
FIG. 45 is an isometric view of an alternate embodiment of a sub-assembly of the first connector and the internal spring member in an intermediate position, P$_I$.

FIGS. 45-50 show a connector assembly 866 comprising a first connector 820, a spring member 838 removably positioned therein, and a second connector 860 configured to be coupled in a connected position $P_C$, which is typically found when the connector assembly 866 and the device to which it is coupled are in operation. In the connected position $P_C$, the connector assembly 866 mechanically and electrically couples a device, such as an alternator, battery, and/or other current drawing component, to a power source or power distribution circuit. Referring now to FIG. 45, the first connector 820 and the spring member 838 are shown in the intermediate position $P_I$ wherein the spring resides within the first connector 820. The first connector 820 has first and second ends 822, 824 and a plurality of side walls 826a, 826b, 826c, 826d disposed between the first and second ends 822, 824. One or more connection plates 850 extend away from the second end 824 of the first connector 820. An aperture 828 is disposed through an intermediate portion of each of the side walls 826a-826d.

A plurality of contact arms 830a, 830b, 830c, 830d, 830e, 830f, 830g, 830h extend from the first end 822 across an extent of the associated aperture 828 toward the second end 824. The contact arms 830a-830h are integrally formed from the respective side walls 826a-826d near the first end 822 of the first connector 820. Each of the contact arms 830a-830h extend outward from the respective side walls 826a-826d and form a curvilinear shoulder 832 that terminates in a free end 834. The side walls 826a-826d and the contact arms 830a-830h are disposed about an interior of the first connector 820 and form therein an internal receiver 836.

Figure 46:
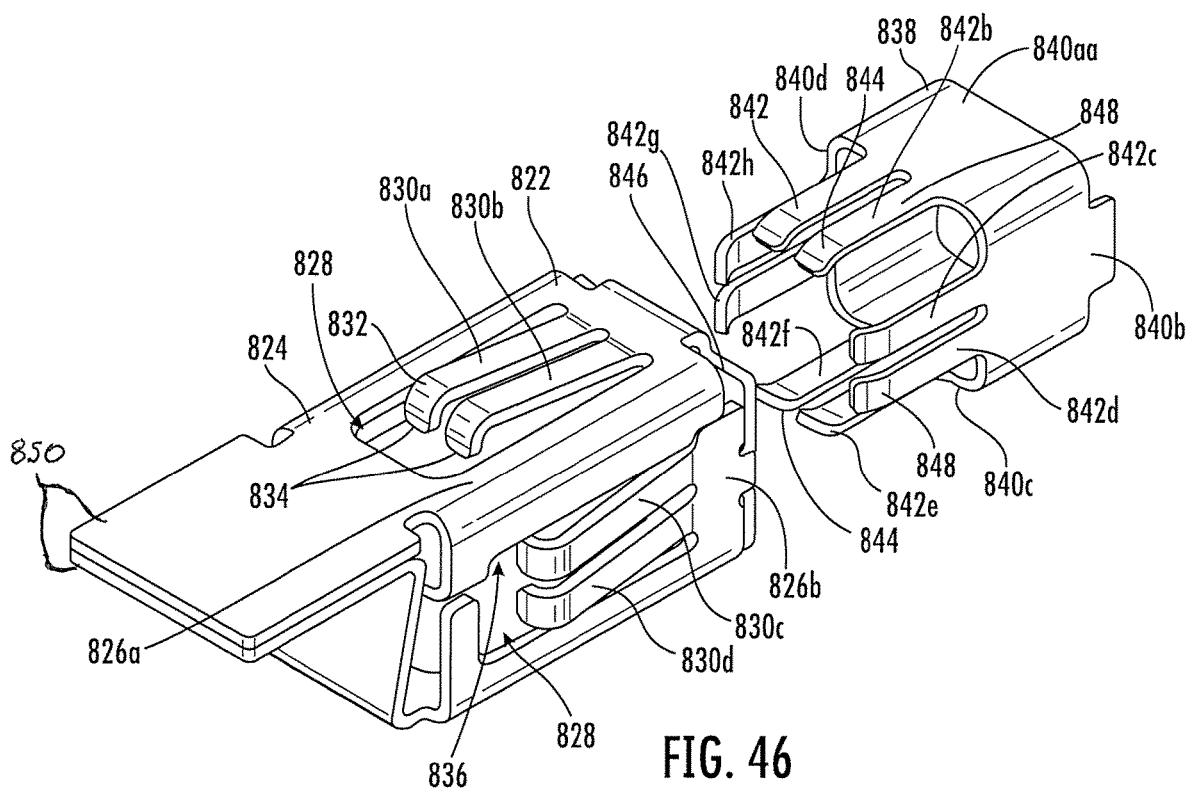
FIG. 46 is an exploded view of the first connector and spring member of FIG. 45.

Referring now to FIG. 46, the connector assembly 866 is exploded such that a spring member 838 is illustrated as removed from the first connector 820. The spring member 838 shown in FIG. 46 is inserted through the first end 822 of the first connector 820 into the internal receiver 836, as shown in FIG. 45. The first connector 820 is configured to receive the spring member 838 into the internal receiver 836 thereof. The spring member 838 has a plurality of side walls 840a, 840b, 840c, 840d. A plurality of spring arms 842a, 842b, 842c, 842d, 842e, 842f, 842g, 842h extend from the respective side walls 840a-840d of the spring member 838. Each of the spring arms 842a-842g are integral with the respective side walls 840a-840d wherefrom said spring arms 842a-842g extend. Further, each of the spring arms 842a-842g have a curvilinear shoulder 844 disposed opposite the associated side wall 840a-840d with which the particular spring arm 842a-842h is integrally formed.

In example embodiments, the curvilinear shoulder 844 of the spring arms 842a-842h increase the ease with which the spring member 838 is inserted into the internal receiver 836 of the first connector 820. A cover member 846 may be integrally formed with the first connector 820 at the first end 822 thereof such that, following insertion of the spring member 838 into the internal receiver 836, the cover member 846 may be folded or re-oriented over the first end 822 thereby partially surrounding and securing in place the spring member 838. Additionally and/or alternatively, the dimensions of the spring member 838 and the first connector 820 are such that the spring member 838 fits snuggly within the internal receiver 836.

Figure 47:
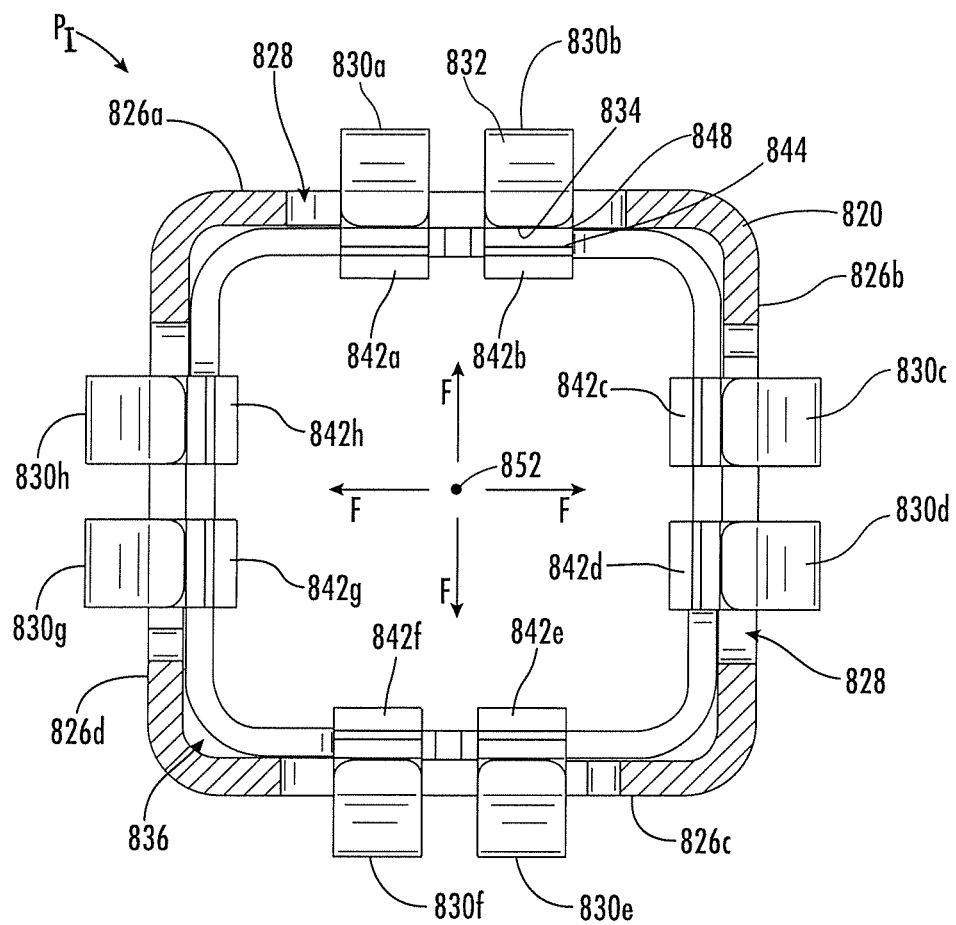
FIG. 47 is a cross-sectional view of the first connector and spring member taken along line 47-47 shown in FIG. 45.

FIG. 47 depicts a cross-section of the first connector 820 and the spring member 838 taken along line 47-47 of FIG. 45 with the connector assembly 866 being in the intermediate position $P_I$. One or more outer surfaces 848 of the spring arms 842a-842h contact the free ends 834 of the respective contact arms 830a-830h. The spring member 838 produces an outwardly directed biasing force F (as depicted by the arrows labeled "F") against the contact arms 830a-830h and away from the interior of the spring member 838 and first connector 820. In example embodiments, the spring member 838 develops an outwardly directed biasing force F against the contact arms 830a-830h and away from a centerline 852 (see FIGS. 47 and 50) of the first connector 820. As shown in the embodiment of FIG. 47, the spring arms 842a-842h correspond with the contact arms 830a-830h. The number of contact arms and the number of spring arms may be the same or different. In an example embodiment wherein the spring member 838 is configured such that it has fewer spring arms than the first connector 820 has contact arms, each spring arm may produce an outward biasing force on two contact arms. Still further, in an example embodiment having fewer contact arms than spring arms, each contact arm may have a force exerted thereon by more than one corresponding spring arm.

The first connector 820 and contact arms 830a-830h may be formed from a first material such as copper, a highly-conductive copper alloy (e.g., C151 or C110), and/or another suitable electrically conductive material. The first material preferably has an electrical conductivity of more than 90% of IACS (International Annealed Copper Standard, i.e., the empirically derived standard value for the electrical conductivity of commercially available copper). For example, C151 typically has 151% of the conductivity of standard, pure copper compliant with IACS. Likewise, C110 has a conductivity of 110% of IACS. In certain operating environments or technical applications, it may be preferable to select C151 because it has anti-corrosive properties desirable for high-stress and/or harsh weather applications. In contemplated embodiments, the spring member 838 may be formed from a second material such as spring steel, stainless steel, and/or another suitable material having greater stiffness (e.g., as measured by Young's modulus) and resilience than the first material of the first connector 820.

The first material (of the first connector 820) and second material (of the spring member 838) are selected to have complementary properties. For example, the Young's modulus of the second material is selected to be relatively greater than that of the first material. The Young's modulus of a suitable first material, e.g., copper alloy (C110), is approximately 115 gigapascals (GPa) at room temperature, while the Young's modulus for a suitable second material, e.g., stainless steel, is approximately 193 GPa at room temperature. In contemplated high-voltage applications, the cross-sectional area of copper alloy forming the first connector is balanced with the conductivity of the selected copper alloy. For example, when a copper alloy having lower conductivity is selected, the contact arms 830a-830h formed therefrom have a greater cross-sectional area so as to adequately conduct electricity. Likewise, selection of a first material having a higher conductivity may allow for contact arms 830a-830h having a relatively smaller cross-sectional area while still meeting conductivity specifications.

In an example embodiment, the CTE of the second material may be greater than the CTE of the first material, i.e., the CTE of the spring member 838 is greater than the CTE of the first connector 820. Therefore, when the assembly of the first connector 820 and the spring member 838 is subjected to the high-voltage and high-temperature environment typical for use of the electrical connector described in the present disclosure, the spring member 838 expands relatively more than the first connector 820. Accordingly, the outward force F produced by the spring member 838 on the contact arms 830a-830h of the first connector 820 is increased in accordance with the increased temperature.

An example application of the present disclosure, such as for use in a vehicle alternator, is suitable for deployment in a class 5 automotive environment, such as that found in passenger and commercial vehicles. Class 5 environments are often found under the hood of a vehicle, e.g., alternator, and present 150° Celsius ambient temperatures and routinely reach 200° Celsius. When copper and/or highly conductive copper alloys are subjected to temperatures above approximately 150° Celsius said alloys become malleable and lose mechanical resilience, i.e., the copper material softens. However, the steel forming the spring member 838 retains hardness and mechanical properties when subjected to similar conditions. Therefore, when the first connector 820 and spring member 838 are both subjected to high-temperature, the first material of the first connector 820 softens and the structural integrity of the spring member 838, formed from the second material, is retained, such that the force F applied to the softened contact arms 830a-830h by the spring member 838 more effectively displaces the softened contact arms 830a-830h outward relative to the interior of the first connector 820, in the connected position $P_C$.

Figure 48:
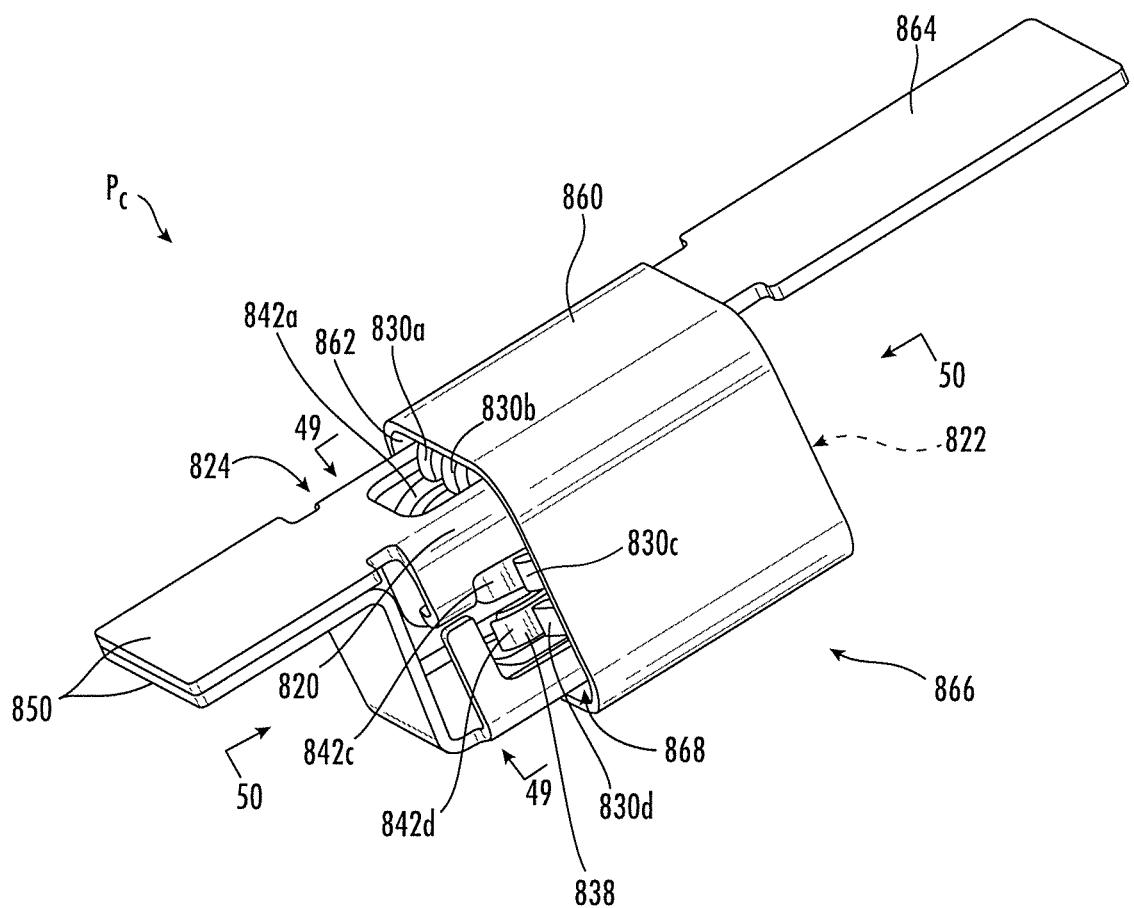
FIG. 48 is an isometric view of a connector assembly wherein the first connector and the internal spring member are disposed within the second connector in a connected position, P$_C$.
Figure 49:
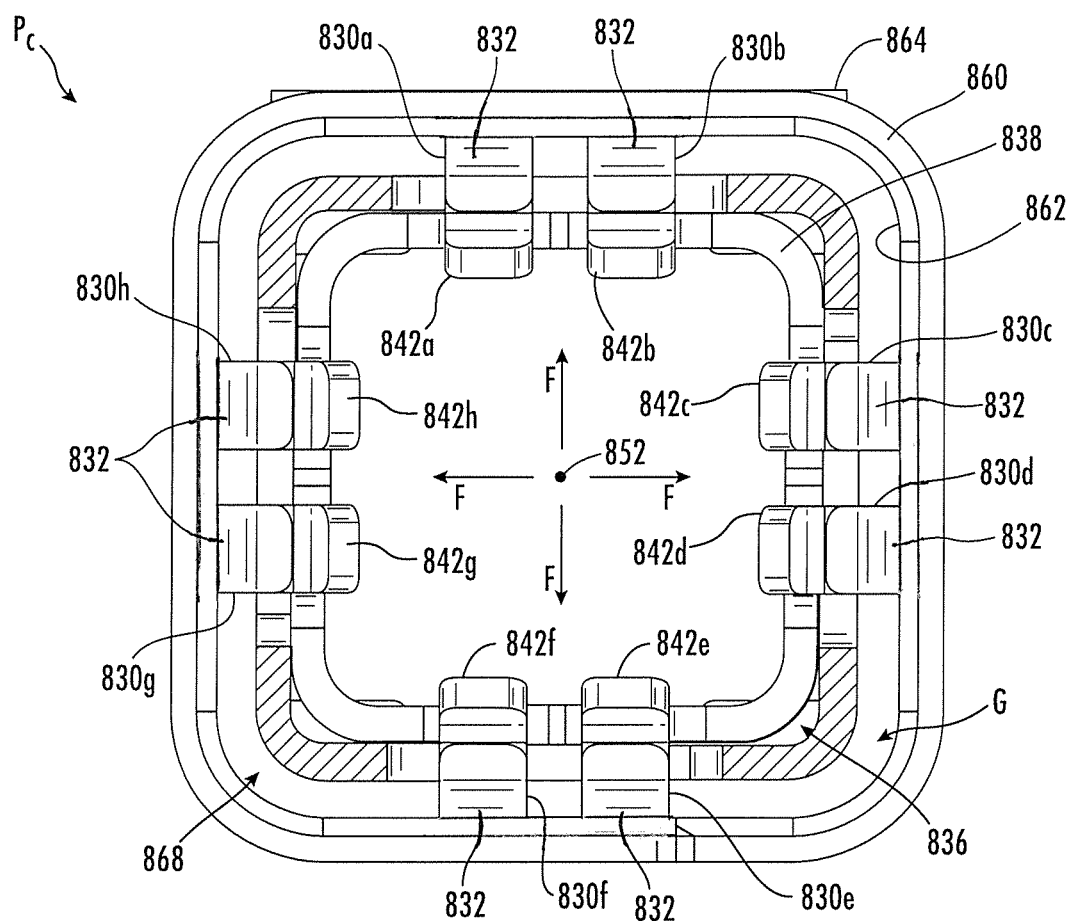
FIG. 49 is a cross-sectional view of the connector assembly of FIG. 48 taken along line 49-49 of FIG. 48.
Figure 50:
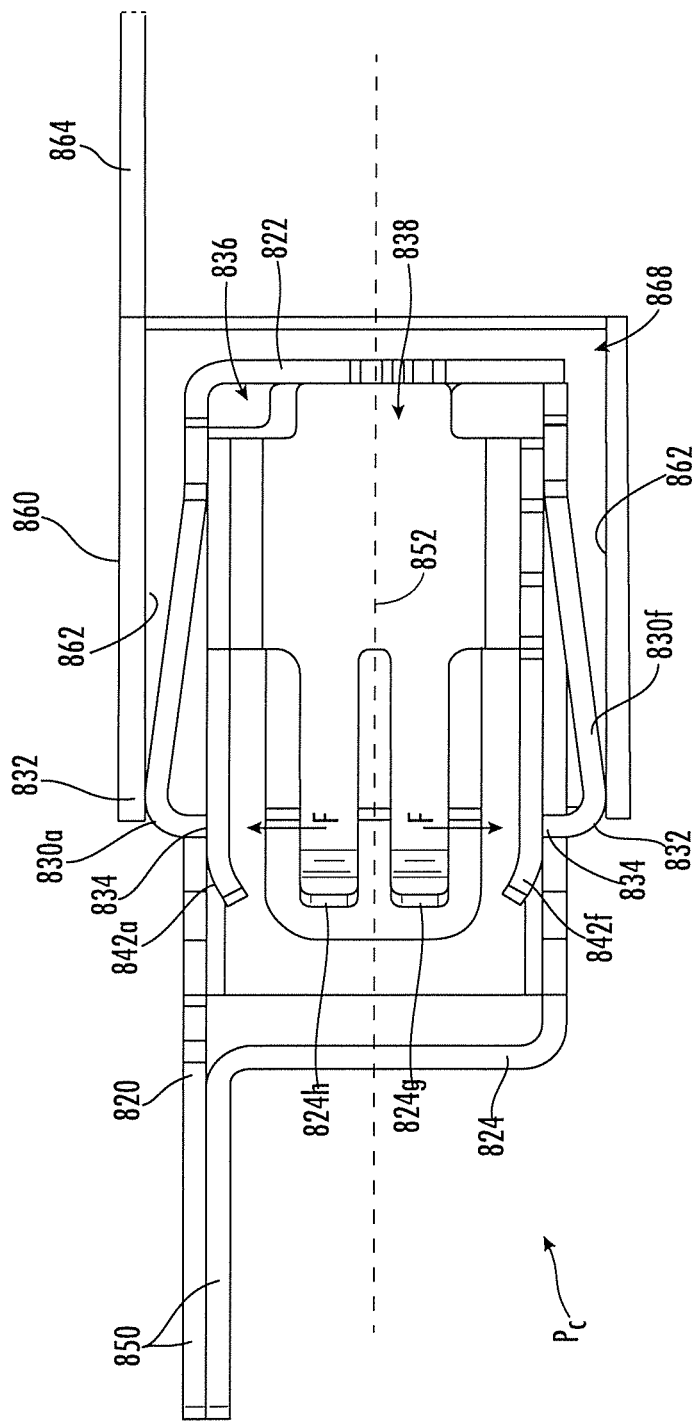
FIG. 50 is a lateral cross-sectional view of the connector assembly of FIG. 48 taken along line 50-50 of FIG. 48.

Referring now to FIGS. 48-50, the first connector 820 and the spring member 838, disposed within the internal receiver 836 of the first connector 820, are shown inserted into an interior receptacle 868 of the second connector 860 to place the connector assembly 866 in the connected position $P_C$. The second connector 860 may be made of copper, copper alloy such as C110 or C151, and/or another suitable highly conductive material. The contact arms 830a-830h contact an inner surface 862 of the second connector 860. In the connected position $P_C$, a gap G is disposed between the side walls 840a-840d of the spring member 838 and the inner surface 862 of the second connector 860. In order to engage the inner surface 862 of the second connector 860, the contact arms 830a-830h span the gap G at discrete locations in the receptacle 868. The first connector 820, spring member 838, and second connector 860, illustrated in FIGS. 48-50, are configured to maintain conductive and mechanical engagement while withstanding elevated temperatures and thermal cycling resulting from high-power, high-voltage applications to which the connector assembly is subjected. Further, the first connector 820 and second connector 860 may undergo thermal expansion as a result of the elevated temperatures and thermal cycling resulting from high-voltage, high-temperature applications, which increases the outwardly directed force F applied by the first connector 820 on the second connector 860. The configuration of the first connector 820, spring member 838, and the second connector 860 increase the outwardly directed connective force F therebetween while the connector assembly 866 withstands thermal expansion resulting from thermal cycling in the connected position $P_C$.

With repeated thermal expansion events, the material memory of the first connector 820 develops to increase an initial outward biasing force F of the spring member 838 on the first connector 820 thereby increasing the contact pressure between the contact arms 830a-830h and the second connector 860. As noted hereinabove, both the first connector 820 and the spring member 838 are subjected to severe thermal cycling during operation of the vehicle or other application wherein the connector assembly 866 is installed. Accordingly, the second material of the spring member 838 may be selected specifically for retaining the mechanical properties of the spring member 838 even after thermal cycling. Spring steel, stainless steel, and/or another suitable material may be selected as the second material of the spring member 838, and, as earlier discussed, a copper and/or copper alloy of the contact arms 830a-830h softens under expectedly high temperatures. Therefore, with repeated, severe thermal cycling, the contact arms 830a-830h develop material memory that impacts their displaced position relative to the first connector 820, due to prior force F applications, while the spring member 838 is largely unaffected by the same thermal cycling.

Further illustrated in FIGS. 48 and 49, in the connected position $P_C$, the first connector 820 provides 360° compliance with the second connector 860 to ensure that a sufficient amount of outwardly directed force F is applied by the first connector 820 to the second connector 860 for electrical and mechanical connectivity. As shown in FIG. 48, the first end 822 of the first connector 820 is inserted into the second connector 860. The connection plates 850 are oriented away from the second connector 860 and connection plate 864 of the second connector is similarly oriented away from the first connector 820. In the orientation illustrated by FIG. 48, both the first connector connection plates 850 and the second connector connection plate 864 are aligned and oriented on the same, upper side of the electrical connector assembly 866. However, because the first connector 820 has contact arms 830a-830h disposed on all four sides thereof, the first connector 820 may be rotated 90°, 180°, and/or 270° while still being insertable within the interior receptacle 868 formed by the second connector 860 and providing the desired mechanical and electrical engagement.

Still further illustrated by FIGS. 48 and 49, the 360° compliance attribute of the first connector 820 establishes electrical and mechanical connection with the second connector 860 on all four sides of the first connector 820 without respect to the insertion orientation thereof. This attribute allows for omission of a keying feature and/or another feature designed to ensure a desired orientation of the components during connection. The 360° compliance attribute of the connector assembly 866 also aids in maintaining mechanical and electrical connection under strenuous mechanical conditions, e.g., vibration. In a traditional blade or fork-shaped connector with 180° compliance, i.e., connection on only two opposing sides, vibration may develop a harmonic resonance that causes the 180° compliant connector to oscillate with greater amplitude at specific frequencies. For example, subjecting a fork-shaped connector to harmonic resonance may cause the fork-shaped connector to open. Opening of the fork-shaped connector during electrical conduction is undesirable because momentary mechanical separation of the fork-shaped connector from an associated terminal may result in electrical arcing. Arcing may have significant negative effects on the 180° compliant terminal as well as the entire electrical system of which the 180° compliant terminal is a component. However, the 360° compliance feature of the present disclosure may prevent the possible catastrophic failures caused by strong vibration and electrical arcing.

Referring to FIG. 50, the curvilinear portion 832 of each of the contact arms 830a-830h is depicted adjacent the free end 834 of each of the contact arms 830a-830h. Further, the curvilinear portion 832 of each of the contact arms 830a-830h is in electrical and mechanical contact with the inner surface 862 of the second connector 860. The radius of curvature of the curvilinear portion 832 of the contact arms 830a-830h allows the free ends 834 thereof to contact the outer surfaces 848 of the respective spring arms 842a-842h. This positive contact between the spring member 838 and the contact arms 830a-830h develops an outwardly directed biasing force F that displaces the contact arms 830a-830h outward relative the spring member 838. This outwardly directed biasing force F is produced both when the first connector 820 is separate from the second connector 860 and when the first connector 820 is inserted into the second connector 860. In the absence of this contact, the outwardly directed biasing force F applied against the contact arms 830a-830h may be uncontrolled, perhaps resulting in wavering or chattering of the contact arms 830a-830h and/or the entire first connector 820 within the second connector 860. However, when the first connector 820 is inserted into the second connector 860, deflection pressure exerted on the contact arms 830a-830h is partially or entirely transferred to the spring arms 842a-842h. Preferably, 100% or nearly 100% of this deflection pressure is transferred to the rigid steel spring member 838. However, the transfer of the deflection pressure from the contact arms 830a-830h does not result in significant, if any at all, deflection of the spring arms 842a-842h. Instead, the spring member 838 supplies a wedging or shimmering effect against the contact arms 830a-830h thereby holding the contact arms 830a-830h in the outwardly displaced position and pressed into engagement with the second connector 860. Further, the radius of curvature of the curvilinear portion 832 of the contact arms 830a-830h, in part, determines the degree of outwardly directed biasing force F imparted from the spring arms 842a-842h to the contact arms 830a-830h associated therewith. For example, a larger radius of curvature (i.e., more gradually rounded curvilinear portion) results in relatively decreased outwardly directed force F biasing the curvilinear portion 832 into contact with the second connector 860. Further, a smaller radius of curvature (i.e., more acutely bent curvilinear portion) develops a relatively greater outwardly directed force F biasing the curvilinear portion 832 into the contact with the second connector portion 860.

The alternator terminal assembly 700 mates with the second connector 703, as shown in FIG. 33-36. The second connector 703 has a metallic, square tube 777 and a high temperature, non-conductive polymer shroud 711 with flange 709. The metallic, square tube 777 is electrically integral with the alternator busbar 708. The metallic square tube 777 is commonly made out of copper C110 or C151. The metallic square tube 777 has an outer surface composed of flat segments 769 and curved segments 768, an inner contact surface 710, a busbar 708, and an upper edge 770, distal from the busbar 708. The plastic shroud 711 has an inner surface 750, an outer surface 711, a flange 709, an upper edge 757 distal from the flange 709, and a mating protrusion 755. The mating protrusion 755 can be used to ensure positive engagement between the first connector and the second connector.

Figure 37:
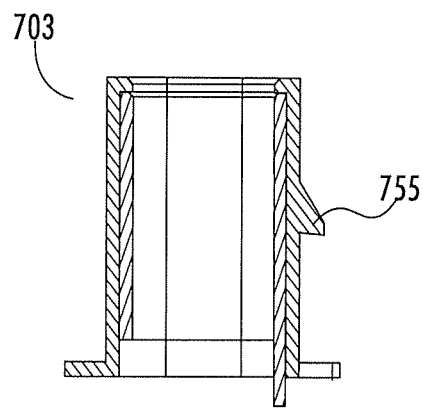
FIG. 37 is a side view of the second connector.
Figure 38:
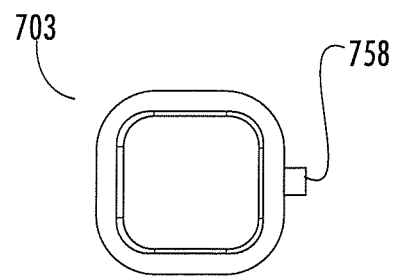
FIG. 38 is an end view of the second connector.

FIGS. 37-38 show two angles of the second connector 703 with a mating protrusion 755 highlighted.

Figures 32, 33:
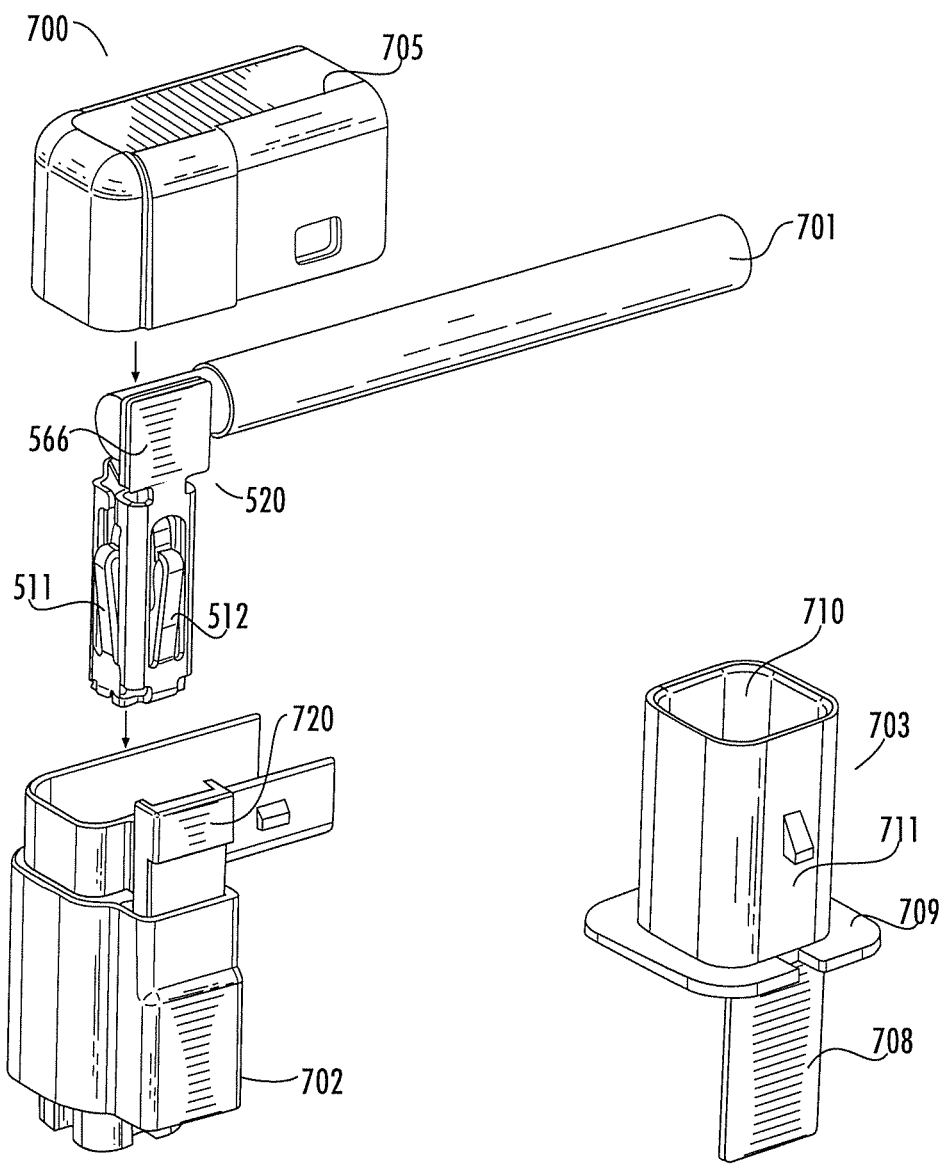
FIG. 32 is an exploded view of the first connector with an alternator connector and cap.
FIG. 33 is an isometric view of a second connector for an alternator.
Figure 34:
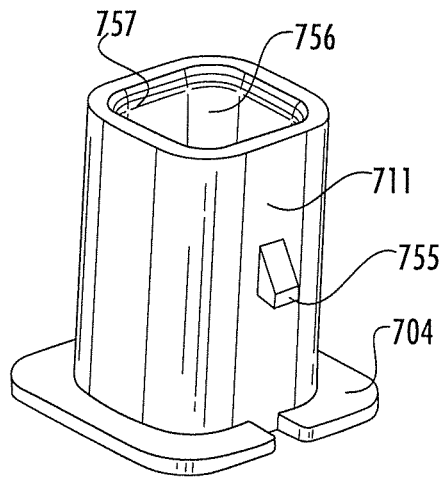
FIG. 34 is an isometric view of the plastic shroud of the second connector for an alternator.
Figure 35:
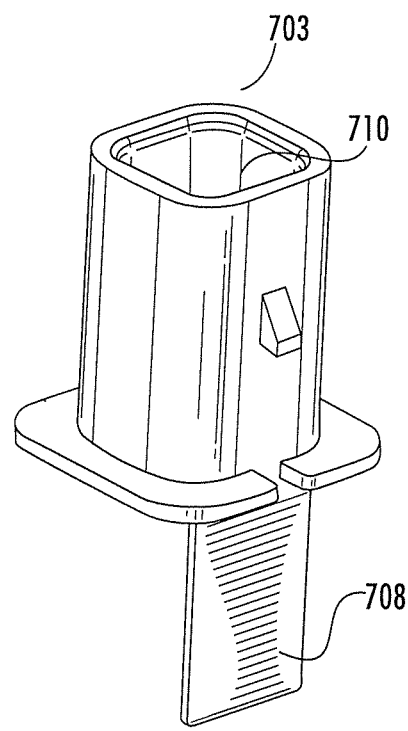
FIG. 35 is an isometric view of the second connector.
Figure 36:
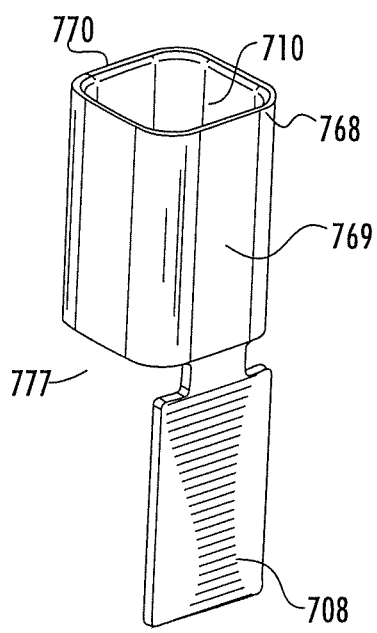
FIG. 36 is an isometric view of the metallic tubular member.

FIG. 32 shows the first connector 520 assembled into an alternator terminal assembly 700. A spade surface 515 (the reverse spade surface 566 is visible in FIG. 32) is ultrasonically welded or crimped to the wire 701. A cap 705 fabricated from high temperature polymers, such as high temperature polyamides, covers spade 566 of the first connector 520 and the wire weld. The rest of the first connector 520 fits into an alternator connector 702.

Figure 39:
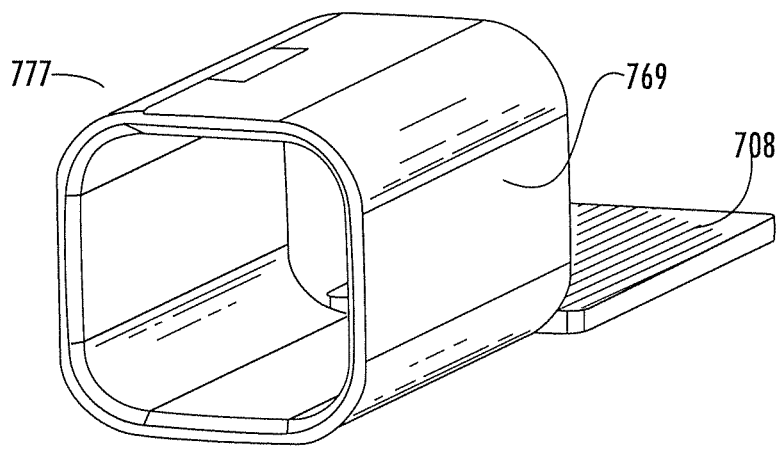
FIG. 39 is an isometric view of the second connector metallic tubular member with an integral straight busbar.
Figure 40:
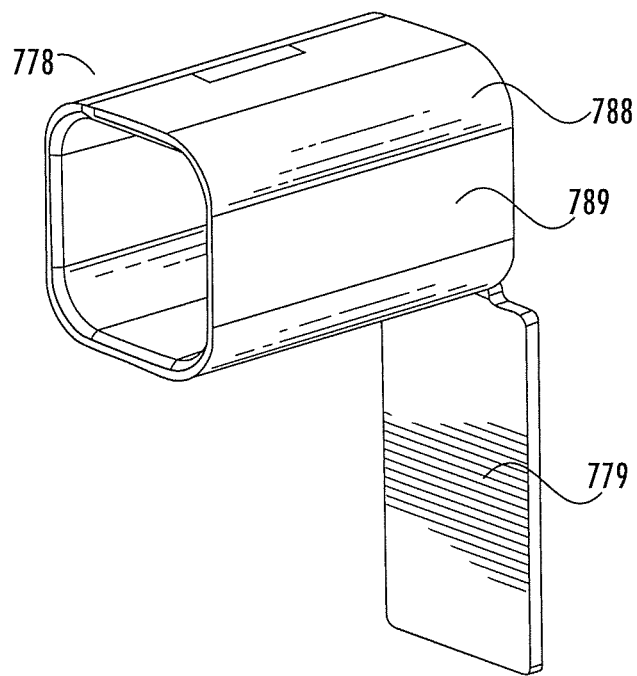
FIG. 40 is an isometric view of the second connector metallic tubular member with an alternative embodiment and orientation of the integral busbar.

FIGS. 39-40 show two different embodiments of the metallic, square tube 778, 777. In one, the busbar 708 is parallel to the metallic tube 777. The busbar 708 is integral with the surface of the metallic tube 769. In the other embodiment, the busbar 779 is orthogonal to the surfaces 789, 788 of the metallic tube 778.

Figure 41:
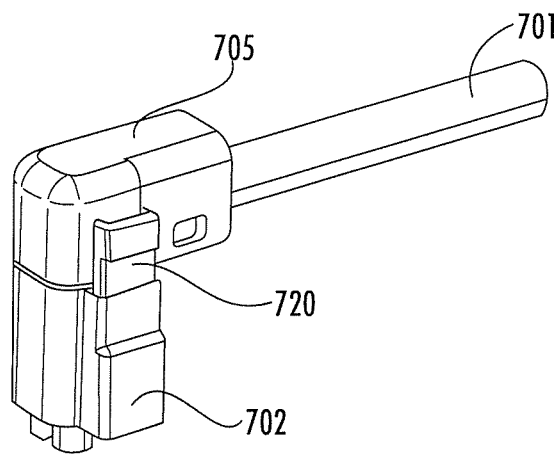
FIG. 41 is an isometric view of the first connector implemented on the alternator connector.
Figure 42:
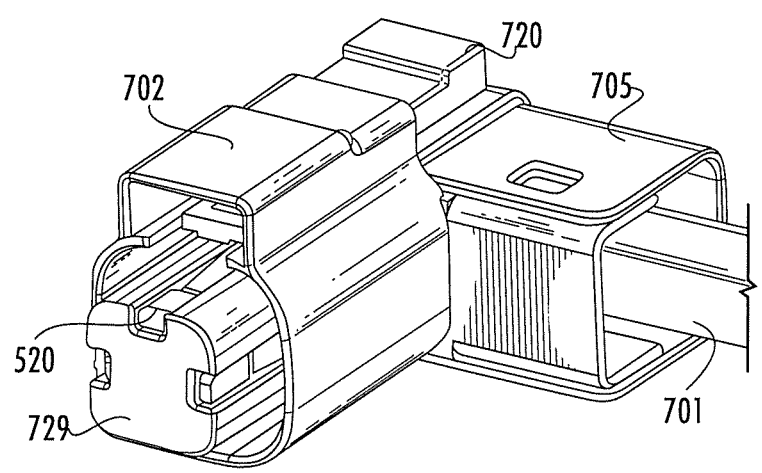
FIG. 42 is an alternative isometric view of the first connector implemented on the alternator connector.

FIGS. 41-42 show the first connector 520 in situ in an alternator terminal assembly 700. The cap 705 segment is joined to the alternator connector segment 702. The alternator connector segment has a plastic shroud 729 to prevent premature electrical contact. The beams 511 extend pass the plastic shroud 729, creating an electrical connection when mated with the second connector 703. The alternator terminal assembly 700 has a connector position assurance indicator 720.

Figure 44:
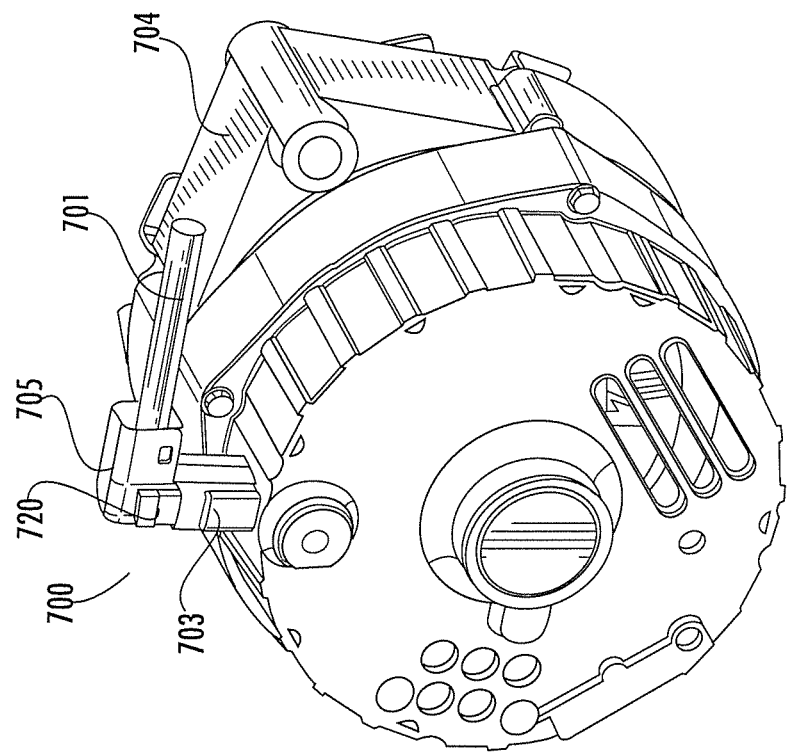
FIG. 44 is an isometric view of the present disclosure implemented on the alternator connector, in situ on the alternator.
Figure 43:
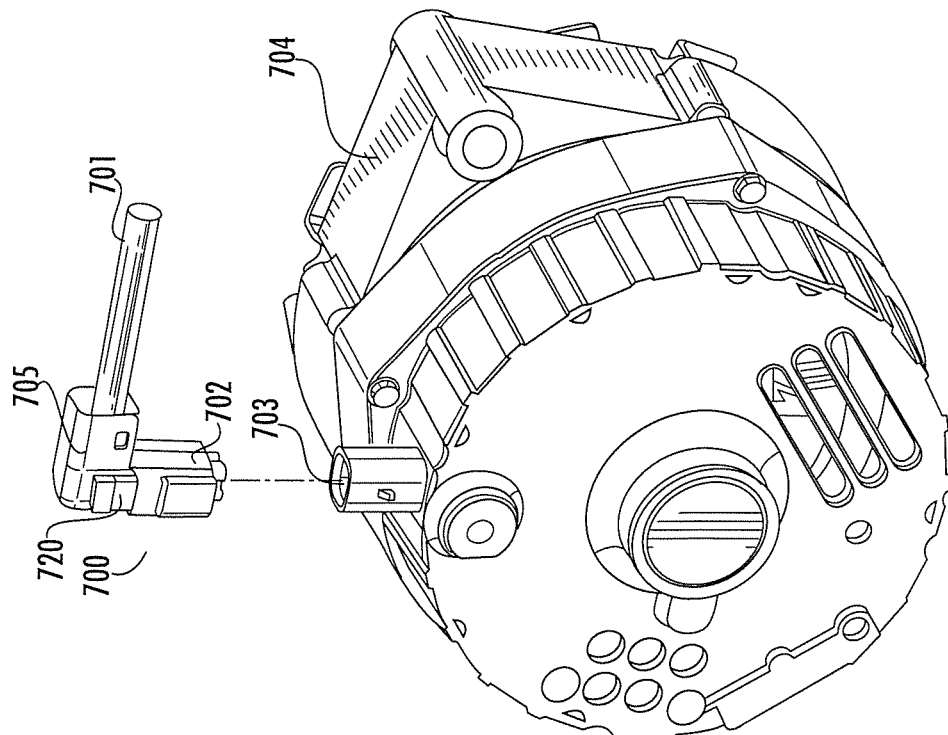
FIG. 43 is an isometric view of the present disclosure implemented on the alternator connector, with an alternator.

FIGS. 43-44 show the alternator terminal assembly 700 in situ with an alternator 704. The second connector 703 is integral to the alternator 704. The alternator terminal assembly 700 with the first connector 520 mates with the second connector 703 as shown in FIG. 42. The connector position assurance indicator 720 shows whether the connector is fully engaged and locked.

INDUSTRIAL APPLICABILITY

The above disclosure may represent an improvement in the art because it improves the mechanical and electrical connection developed by a first electrical connector and second connector withstanding high-power, high-voltage conditions. Typical high-power and/or high voltage conditions are found in the automotive industry, as noted hereinabove. Further high-power and/or high voltage conditions are found in other applications such as for military equipment, space flight, electric vehicles, industrial machinery, etc.

While some implementations have been illustrated and described, numerous modifications come to mind without significantly departing from the spirit of the disclosure; and the scope of protection is only limited by the scope of the accompanying claims.

Headings and subheadings, if any, are used for convenience only and are not limiting. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. An electrical connector assembly, the connector assembly comprising:
   a first electrically conductive connector having a receiver and a first contact beam;
   an internal spring member dimensioned to reside within the receiver of the first connector and having a first spring arm;
   a second electrically conductive connector with a receptacle dimensioned to receive a portion of both the first connector and the spring member residing within the receiver of the first connector to define a connected position;
   wherein in the connected position and when the connector assembly is subject to an environment with a first temperature, the first spring arm of the spring member exerts a first outwardly directed force on the first contact beam of the first connector; and
   wherein in the connected position and when the connector assembly is subject to an environment with a second temperature that is higher than the first temperature, the first spring arm of the spring member exerts a second outwardly directed force on the first contact beam of the first connector that is greater than the first outwardly directed force.

2. The electrical connector assembly of claim 1, wherein the first contact beam includes a free-end that resides against an outer surface of the first spring arm when the spring member is positioned within the receiver of the first connector.

3. The electrical connector assembly of claim 2, wherein the free-end of the first contact beam is configured to be directed inward by the second connector and against an extent of the first spring arm when the electrical connector assembly is in the connected position.

4. The electrical connector assembly of claim 2, wherein both of the first and second outwardly directed forces are exerted by the first spring arm to said free-end of the first contact beam.

5. The electrical connector assembly of claim 1, wherein the internal spring member includes a base with an outer surface, said base being integrally formed with the first spring arm, and
   wherein when the internal spring member is separated from the first electrically conductive connector, the outer surface of the base is co-planer with an outer surface of the first spring arm.

6. The electrical connector assembly of claim 1, wherein the first electrically conductive connector has a first coefficient of thermal expansion and the spring member has a second coefficient of thermal expansion that is greater than the first coefficient of thermal expansion.

7. The electrical connector assembly of claim 1, wherein the outwardly directed force applied by the first spring arm on the first contact beam in the connected position is not reduced by residual material memory during operation of the electrical connector assembly.

8. The electrical connector assembly of claim 1, wherein the spring member includes a base that the first spring arm extends therefrom, and wherein an outer surface of the base is placed in contact with an inner surface of the first portion of the receiver when the spring member is positioned within the receiver of the first connector.

9. The electrical connector assembly of claim 1, further comprising an electrically non-conductive shroud that covers an extent of the first connector and includes a connector position assurance indicator.

10. An electrical connector assembly for use in connecting components in a motor vehicle, the connector assembly comprising:
    a first electrically conductive connector formed from a first material with a first coefficient of thermal expansion, the first connector having a plurality of elongated contact beams arranged to define a receiver, the plurality of elongated contact beams include a first contact beam;
    an internal spring member formed from a second material with a second coefficient of thermal expansion that is greater than the first coefficient of thermal expansion of said first connector, the spring member having a plurality of spring arms the plurality of spring arms include a first spring arm;
    wherein when the spring member is inserted into the receiver of the first electrically conductive connector, only an end portion of the first contact beam contacts the first spring arm; and
    an electrically non-conductive shroud that surrounds an extent of the first connector and includes a connector position assurance indicator.

11. The electrical connector assembly of claim 10, wherein a first spring arm of the plurality of spring arms is configured to provide an outwardly directed biasing force on a first contact beam of the plurality of elongated contact beams under certain operating conditions of the electrical connector assembly.

12. The electrical connector assembly of claim 11, further comprising a second electrically conductive connector with a receptacle dimensioned to receive a portion of both the first connector and the spring member residing within the receiver of the first connector to define a connected position;
    wherein in the connected position and when the connector assembly is subject to an environment with a first temperature, the first spring arm of the spring member exerts a first outwardly directed force on the first contact beam of the first connector; and
    wherein in the connected position and when the connector assembly is subject to an environment with a second temperature that is higher than the first temperature, the first spring arm of the spring member exerts a second outwardly directed force on the first contact beam of the first connector that is greater than the first outwardly directed force.

13. The electrical connector assembly of claim 12, wherein the first contact beam includes a free-end that resides against an outer surface of the first spring arm when the spring member is positioned within the receiver of the first connector.

14. The electrical connector assembly of claim 11, further comprising a second electrically conductive connector with a receptacle dimensioned to receive a portion of both the first connector and the spring member residing within the receiver of the first connector to define a connected position; and
    wherein the first contact beam includes a free-end that is displaced inward by the second connector and against an extent of the first spring arm when the electrical connector assembly is in the connected position.

15. The electrical connector assembly of claim 10, wherein the number of elongated contact beams contained in the plurality of elongated contact beams is equal to the number of spring arms contained in the plurality of spring arms.

16. The electrical connector assembly of claim 10, wherein the plurality of elongated contact beams extend from a base of said first connector, and wherein said base forms an extent of the receiver.

17. The electrical connector assembly of claim 10, wherein said first connector includes a plurality of side walls, and wherein a first side wall within the plurality of side walls is positioned substantially perpendicular to a second side wall within the plurality of side walls; and
  wherein the first and second side walls each include at least one contact beam.

18. The electrical connector assembly of claim 10, wherein the first material of said first connector includes copper and the second material of said spring member includes steel.

19. The electrical connector assembly of claim 10, further comprising a second electrically conductive connector with a receptacle dimensioned to receive a portion of both the first connector and the spring member residing within the receiver of the first connector to define a connected position; and
  wherein in the connected position, an elongated contact beam contained in the plurality of elongated contact beams is wedged between: (i) an inner surface of the second electrically conductive connector and (ii) a spring arm contained in the plurality of spring arms.

20. The electrical connector assembly of claim 10, wherein a gap is formed between the first contact beam and the first spring arm when the spring member is inserted into the receiver of the first electrically conductive connector.

* * * * *